US012016385B2

(12) United States Patent
Li et al.

(10) Patent No.: US 12,016,385 B2
(45) Date of Patent: Jun. 25, 2024

(54) RELEASING MECHANISM AND AEROSOL GENERATING DEVICE

(71) Applicants: SHANGHAI NEW TOBACCO PRODUCT RESEARCH INSTITUTE CO., LTD, Yangpu District (CN); SHANGHAI TOBACCO GROUP CO., LTD, Shanghai (CN)

(72) Inventors: Xianglin Li, Shanghai (CN); Liuming Huang, Shanghai (CN); Jiajun Wang, Shanghai (CN); Jianghong Qu, Shanghai (CN)

(73) Assignees: SHANGHAI NEW TOBACCO PRODUCT RESEARCH INSTITUTE CO., LTD., Yangpu District (CN); SHANGHAI TOBACCO GROUP CO., LTD, Shanghai (CN)

( * ) Notice: Subject to any disclaimer, the term of this patent is extended or adjusted under 35 U.S.C. 154(b) by 730 days.

(21) Appl. No.: 17/262,571

(22) PCT Filed: Nov. 26, 2018

(86) PCT No.: PCT/CN2018/117387
§ 371 (c)(1),
(2) Date: Jan. 22, 2021

(87) PCT Pub. No.: WO2020/029477
PCT Pub. Date: Feb. 13, 2020

(65) Prior Publication Data

US 2021/0298359 A1 Sep. 30, 2021

(30) Foreign Application Priority Data

Aug. 7, 2018 (CN) ........................ 201810891826.X

(51) Int. Cl.
*A24F 40/46* (2020.01)
*A24F 40/20* (2020.01)
(Continued)

(52) U.S. Cl.
CPC .............. *A24F 40/46* (2020.01); *A24F 40/20* (2020.01); *A24F 40/85* (2020.01); *H05B 1/0297* (2013.01); *H05B 3/06* (2013.01)

(58) Field of Classification Search
CPC .......... A24F 40/46; A24F 40/85; A24F 40/20; H05B 1/0297; H05B 3/06
(Continued)

(56) References Cited

U.S. PATENT DOCUMENTS 8,997,753 B2 * 4/2015 Li ............................ H05B 3/16 131/273
9,004,073 B2 * 4/2015 Tucker ..................... H05B 3/10 131/273
(Continued)

FOREIGN PATENT DOCUMENTS

CN 108013513 A 5/2018
CN 108451028 A 8/2018
(Continued)

OTHER PUBLICATIONS

International Search Report and Written Opinion for related PCT App No. PCT/CN2018/117387 dated May 10, 2019, 19 pgs. (partial translation).

*Primary Examiner* — Gary F Paumen
(74) *Attorney, Agent, or Firm* — PROCOPIO, CORY, HARGREAVES & SAVITCH LLP

(57) ABSTRACT

The present invention relates to a loosening mechanism and an aerial fog generating device, wherein the loosening mechanism comprises a rotating portion; the rotating portion comprises an outer housing and an inner housing, the outer
(Continued)

housing is sleeved onto the inner housing, and the inner housing is used for placing an aerial fog forming substrate; a pressing mechanism is provided on the inner housing, the outer housing is capable of moving along a circumferential direction, and the circumferential movement is converted into axial movement to drive the pressing mechanism to apply a radial pressing force to the aerial fog forming substrate; the inner housing is capable of being rotatably connected to the aerial fog generating device between a first position and a second position, and the aerial fog forming substrate and a heating element are capable of generating relative movement in the circumferential direction in the process from the first position to the second position; and the aerial fog forming substrate is in contact with the heating element in the first position and the second position. By using the loosening mechanism, a user can easily pull out the aerial fog forming substrate from the heating element, so that the user can conveniently clean the aerial fog generation device.

57 Claims, 11 Drawing Sheets

(51) Int. Cl.
*A24F 40/85* (2020.01)
*H05B 1/02* (2006.01)
*H05B 3/06* (2006.01)

(58) Field of Classification Search
USPC .......................................................... 131/329
See application file for complete search history.

(56) References Cited

U.S. PATENT DOCUMENTS 9,282,772 B2 * 3/2016 Tucker .................. A61M 15/06
9,326,547 B2 * 5/2016 Tucker ..................... H05B 3/16
9,456,635 B2 * 10/2016 Tucker ................. A61M 11/003
9,474,306 B2 * 10/2016 Tucker ..................... H05B 3/42
9,668,523 B2 * 6/2017 Tucker .................. A24F 40/485
9,848,656 B2 * 12/2017 Tucker ................. A61M 11/003
9,854,839 B2 * 1/2018 Tucker .................... A24F 40/70
10,092,037 B2 * 10/2018 Tucker ................. A61M 11/042
10,098,386 B2 * 10/2018 Tucker ..................... H05B 3/42
10,123,566 B2 * 11/2018 Tucker ................. A61M 11/003
2013/0192615 A1 * 8/2013 Tucker ................. A61M 11/042 131/328
2013/0192619 A1 * 8/2013 Tucker ................. A61M 11/042 29/611
2013/0192622 A1 * 8/2013 Tucker ..................... H05B 3/16 131/329
2013/0192623 A1 * 8/2013 Tucker ..................... H05B 3/16 131/329
2016/0120229 A1 * 5/2016 Tucker ..................... H05B 3/16 131/329
2016/0165956 A1 * 6/2016 Tucker ..................... H05B 3/42 131/329
2017/0042249 A1 * 2/2017 Tucker ................. H05B 3/0014
2017/0238615 A1 * 8/2017 Tucker .................. A24F 40/485
2017/0238616 A1 * 8/2017 Tucker .................... A24F 40/70
2017/0347716 A1 * 12/2017 Tucker ................. H05B 3/0014
2018/0192703 A1 * 7/2018 Tucker ..................... H05B 3/10

FOREIGN PATENT DOCUMENTS

CN 207940349 U 10/2018
CN 108720090 A 11/2018
CN 108783605 A 11/2018
CN 108851248 A 11/2018

* cited by examiner

RELEASING MECHANISM AND AEROSOL GENERATING DEVICE

CROSS-REFERENCE TO RELATED APPLICATIONS

This application is a U.S. National Stage entry of PCT Application No: PCT/CN2018/117387 filed Sep. 26, 2018, which claims priority to Chinese Patent Application No. 201810891826.X filed Aug. 7, 2018, the contents of which are incorporated herein by reference.

TECHNICAL FIELD

The invention relates to a technical field of aerosol generation, and in particular to a releasing mechanism and an aerosol generating device.

BACKGROUND OF THE INVENTION

In recent years, an impact of traditional cigarettes on health and environment has gradually attracted attentions of countries around the world. Tobacco producers are committed to providing consumers with less harmful tobacco products. Low-temperature heating and non-burning tobacco products as a new form of tobacco consumer goods have gradually been welcomed by the market and are increasingly accepted by cigarette consumers in most countries.

For example, Chinese Patent Publication No. CN106376975A provides an aerosol generating device and a method of using the same. The aerosol generating device comprises: a chamber having a chamber case and a chamber accommodating space formed by the chamber case, wherein the chamber accommodating space is used for accommodating a medium to be heated, and a top of the chamber is provided with filter cotton: a sealing cover disposed at a bottom of the chamber to seal the bottom of the chamber, wherein the bottom of the sealing cover is formed with a penetrated part: an air deflector disposed below the sealing cover and having a guiding groove and a guiding hole, wherein the guiding hole is disposed correspondingly to the penetrated part: and a heater including a heater bottom cover and a heating ceramic sheet, wherein the heater bottom cover is disposed below the air deflector, and the heating ceramic sheet is fixed to the heater bottom cover, passes through the guiding hole, and pierces the penetrated part to penetrate into the chamber accommodating space.

Chinese Patent Publication No. CN103974640A provides an aerosol generating device. The aerosol generating device is configured to receive an aerosol-forming substrate and configured to heat the aerosol-forming substrate using both an internal heater, positioned within the substrate, and an external heater positioned outside of the substrate. The use of both an internal and an external heater allows each heater to operate at a lower temperature than would be required when using either an internal or external heater alone. By operating the external heater at a lower temperature than the internal heater, the substrate can be heated to have a relatively uniform temperature distribution and the external temperature of the device can be kept to an acceptably low level.

Existing aerosol generating device generally heats an aerosol-forming substrate by a heater to generate aerosol which is to be suctioned by a user. The aerosol-forming substrate will stick to the heater when the user pulls out the aerosol-forming substrate after completing suctioning. Thus, the aerosol-forming substrate is difficult to be pulled out from the aerosol generating device, which is inconvenient to use and affects experience feeling in use of consumers.

SUMMARY OF THE INVENTION

The problem solved by the present invention is that the aerosol-forming substrate will stick to the heater when the user pulls out the aerosol-forming substrate after completing suctioning. Thus, the aerosol-forming substrate is difficult to be pulled out from the aerosol generating device, which is inconvenient to use and affects user experience of consumers.

In order to solve the above problems, the purpose of the present invention is to provide a releasing mechanism for an aerosol generating device provided with a heating body, characterized in that the heating body is used to be inserted into an aerosol-forming substrate placed on the releasing mechanism, the releasing mechanism comprising: a rotary portion comprising an outer case and an inner case, wherein the outer case is sleeved on the inner case and the aerosol-forming substrate is placed on the inner case; a pressing mechanism provided on the inner case, wherein the outer case is movable along a circumferentially direction, and the circumferential movement is transferred to movement along an axial direction which coincides with an inserting direction of the heating body, to drive the pressing mechanism to apply a radial pressing force to the aerosol-forming substrate: the inner case is rotatably connected to the aerosol generating device between a first position and a second position, and the aerosol-forming substrate and the heating body are relatively movable in the circumferential direction when switching from the first position to the second position: both in the first position and in the second position, the aerosol-forming substrate is in contact with the heating body.

Optionally, the aerosol-forming substrate has a first axial position with respect to the heating body in the first position: the aerosol-forming substrate has a second axial position with respect to the heating body in the second position, and the first axial position is the same as the second axial position.

Optionally, the inner case is rotatable along the circumferential direction in synchronization with the outer case when switching from the first position to the second position.

Optionally, one of the inner circumferential surface of the outer case and the outer circumferential surface of the inner case is provided with a first groove extending along the axial direction and the other is a convex component, wherein the convex component is disposed in the first groove.

Optionally, along the axial direction, the outer case has a first end facing the aerosol generating device and the aerosol generating device has a second end facing the outer case, wherein one of the first end and the second end comprises a first convex portion and the other comprises a second concave portion: the first convex portion and the second concave portion are matched with each other.

Optionally, the first end comprises a first convex portion and a first concave portion which are provided alternately, and the second end comprises a second convex portion and a second concave portion which are provided alternately, wherein the shape of the first convex portion matches the shape of the second concave portion and the shape of the second convex portion matches the shape of the first concave portion.

Optionally, the outer case is screwed with the aerosol generating device.

Optionally, inner case is provided with at least one first through-hole connecting with the inner chamber of the inner case and extending along the axial direction: the pressing mechanism is provided with a first end and a second end along the axial direction, wherein the first end is closer to an opening of the axial end of the inner case than the second end, and at least one of the first end and the second end is connected fixedly with the inner case: the portion between the first end and the second end is used for applying a radial pressing force to the aerosol-forming substrate.

Optionally, a convex part is provided between the first end and the second end, which protrudes from the first through-hole toward the inner wall of the outer case.

Optionally, the portion between the convex part and one of the first end and the second end is provided with a curved portion.

Optionally, the portion between the convex portion and one of the first end and the second end is provided with a curved part.

Optionally, the convex part is abutted against the inner wall of the outer case.

Optionally, there is an elastic force between the convex portion and the inner wall of the outer case along the radial direction.

Optionally, the inner wall of the outer case is provided with a second groove, wherein the convex part is disposed in the second groove.

Optionally, the inner case comprises a base provided with a concave part, wherein the second end is inserted into the concave portion.

Optionally, the concave part goes through the base along the axial direction.

Optionally, the rear surface the convex portion is a concave surface.

Optionally, the portion between the first end and the second end facing the aerosol-forming substrate is a flat surface.

Optionally, the portion between the first end and the second end facing the aerosol-forming substrate is provided with a protrusion.

Optionally, the first end is connected fixedly with the inner case, and the second end is connected flexibly with the inner case.

Optionally, the inner case is provided with at least one second through-hole connecting with the inner chamber of the inner case and extending along the axial direction: the heating body is exposed by the second through-hole.

Optionally, at least two second through-holes are provided and spaced apart along the circumferential direction.

Optionally, further comprising a structure for debris discharge which allows the debris in the inner case to flow out.

Optionally, the structure for debris discharge comprises an inclined hole, and the inclined hole can guide the debris in the inner case to flow out through the inclined hole.

Optionally, further comprising a base, wherein the structure for debris discharge comprises a third through-hole provided on the base, the third through-hole is connected to the inclined hole, and the inclined hole can guide the debris in the third through-hole to flow out through the inclined hole.

Optionally, the third through-hole is provided around the heating body.

Optionally, inclined hole is provided with a first surface and a second surface which are arranged oppositely, wherein the third through-hole is provided on the plane of the first surface, and the plane of the second surface is set at an acute angle with the plane of the first surface.

Optionally, the acute angle ranges from 30 degrees to 60 degrees.

Optionally, the outer case comprises:

a body portion of the outer case; an inner lining arranged around the inner circumferential surface of the body portion of the outer case along the circumferential direction.

Optionally, along the axial direction, the body portion of the outer case comprises a first annular component and a second annular component that are connected with each other, wherein the second annular component is closer to the aerosol generating device compared to the first annular component.

Optionally, the second annular component has a bumpy surface.

Optionally, the outer case is detachably connected with the inner case.

The present invention also provides an aerosol generating device comprising a heating body; the release mechanism of any one of the above, wherein the heating body is used to be inserted into the aerosol-forming substrate placed on the releasing mechanism.

Optionally, further comprising a body portion, wherein the heating body is provided on the body portion, and the inner case is rotatably connected to the body portion of the device in the circumferential direction.

Optionally, further comprising the body portion, wherein the heating body is provided on the body portion, and the inner case is rotatably connected to the heating body in the circumferential direction.

Optionally, the body portion of the device is provided with a fixed seat with an accommodating portion on which the mounting portion of the heating body is mounted, wherein the accommodating portion is used for limiting the circumferential movement of the mounting portion.

the fixed seat comprises the accommodating portion and a fourth through-hole along the axial direction: the heating body goes through the fourth through-hole along a direction from the accommodating portion to the fourth through-hole;

the fixed seat is mounted on a circuit control board which is electrically connected to the heating body.

Optionally, further comprising a limiting portion mounted on the fixed seat along the axial direction, and the mounting portion is provided between the limiting portion and the accommodating portion, wherein the limiting portion is used for limiting the axial movement of the mounting portion.

Optionally, the cross sections of the mounting portion and the accommodating portion are not in a shape of a circle.

Optionally, in the direction from the accommodating portion to the fourth through-hole, the mounting portion comprises a first part and a second part, and the accommodating portion comprises a third part and a fourth part, wherein the first part is mounted on the third part and the second part is mounted on the fourth part: the cross sections of the first part and the third part are not in a shape of a circle, or the cross sections of the second part and the fourth part are not in a shape of a circle.

Optionally, in the direction from the accommodating portion to the fourth through-hole, the mounting portion comprises a first part and a second part, wherein the first part is mounted on the accommodating portion and the second part is mounted on the fourth through-hole: the cross sections of the first part and the accommodating portion are not in a shape of a circle, or the cross sections of the second part and the fourth through-hole are not in a shape of a circle.

Optionally, further comprising wires, and the mounting portion of the heating body is provided with a through-hole for the wires to pass through.

Optionally, the inner circumferential surface of the mounting portion of the heating body fits with the outer circumferential surface of the heating body, and the inner circumferential surface of the mounting portion is spaced apart from the heating body in the radial direction.

Optionally, the fixed seat is detachably mounted on the circuit control board.

Optionally, the fixed seat further comprises a first extension portion that extends along the axial direction: the limiting portion comprises a second extension portion that extends along the axial direction, wherein the circuit control board is provided between the first extension portion and the second extension portion, connected to the first extension portion and the second extension portion respectively.

Optionally, the first extension portion and the second extension portion are detachably connected to the circuit control board respectively.

Optionally, the portion of the first extension portion facing the circuit control board is provided with a first clamping portion and a second clamping portion that extend along the axial direction respectively:

the portion of the second extension portion facing the circuit control board is provided with a third clamping portion and a fourth clamping portion that extend along the axial direction respectively, wherein the third clamping portion and the fourth clamping portion are placed between the first clamping portion and the second clamping portion, or alternatively the first clamping portion and the second clamping portion are placed between the third clamping portion and the fourth clamping portion;

the first clamping portion is fit with the third clamping portion, and the second clamping portion is fit with the fourth clamping portion.

Optionally, the clamping space defined by the first clamping portion, the second clamping portion, the third clamping portion and the fourth clamping portion can accommodate the mounting portion.

Optionally, the portion of the second extension portion facing the circuit control board is provided with a limiting component that extends along the axial direction and is abutted against the mounting portion.

Optionally, the fixed seat further comprises a third extension portion that extends along the axial direction and is arranged opposite to the first extension portion along the radial direction.

the second extension portion is provided with an insertion end that is inserted between the first extension portion and the third extension portion along the axial direction and is fit with the third extension portion in the axial direction.

Optionally, further comprising a passage for debris discharge which allows the debris in the inner case to flow out.

Optionally, the body portion of the device is spaced apart from the base of the releasing mechanism along the axial direction.

Optionally, the passage for debris discharge comprises a structure for debris discharge of the releasing mechanism and an axial interval between the fixed seat of the body portion of the device and the base of the releasing mechanism, wherein the structure for debris discharge comprises the inclined hole, and the inclined hole can guide the debris in the inner to flow out through the inclined hole.

Optionally, the structure for debris discharge comprises a base and the third through-hole provided on the base, wherein the third through-hole is connected to the inclined hole, and the inclined hole can guide the debris in the third through-hole to flow out through the inclined hole.

Optionally; the third through-hole is provided around the heating body.

Optionally; the body portion of the device is provided with a fixed seat with an accommodating portion on which a mounting portion of the heating body is mounted, wherein the accommodating portion is used for limiting the circumferential movement of the mounting portion, and the fixed seat is spaced apart from the base of the releasing mechanism along the axial direction.

Optionally, the portion of the fixed seat facing the base is provided with a surface arranged aslant with respect to the portion of the releasing mechanism facing the fixed seat along the axial direction.

Optionally, the mounting portion comprises a first part and a second part, and the inner circumferential surfaces of the first part and the second part are fit with the outer surface of the heating body respectively, wherein the inner circumferential surface of the first part is spaced apart from the heating body in the radial direction.

As above, the present invention provides a releasing mechanism for an aerosol generating device provided with a heating body being used to be inserted into an aerosol-forming substrate placed on the releasing mechanism, the releasing mechanism comprises a rotary portion comprising an outer case and an inner case, wherein the outer case is sleeved on the inner case and the aerosol-forming substrate is placed on the inner case; a pressing mechanism provided on the inner case, wherein the outer case is movable along a circumferentially direction, and the circumferential movement is transferred to movement along an axial direction which coincides with an inserting direction of the heating body, to drive the pressing mechanism to apply a radial pressing force to the aerosol-forming substrate; in addition the inner case is rotatably connected to the aerosol generating device between a first position and a second position, and the aerosol-forming substrate and the heating body are relatively movable in the circumferential direction when switching from the first position to the second position: both in the first position and in the second position, the aerosol-forming substrate is in contact with the heating body.

When a user is suctioning, the aerosol-forming substrate is placed in the inner case, and the heating body is inserted into the aerosol-forming substrate. At this time, the aerosol-forming substrate is in contact with the heating body, and the heating body is controlled to heat the aerosol-forming substrate to generate aerosol for the user to suction. When the user completes suctioning, the outer case is controlled to move along the circumferential direction before the aerosol-forming substrate is pulled out, and the circumferential movement will be transferred to the axial movement, so that the axial movement of the outer case will drive the pressing mechanism to apply a radial pressing force to the aerosol-forming substrate.

Under the radial pressing force, on the one hand, the inner case can move in the circumferential direction with the outer case, and can be rotationally switched from the first position to the second position along the circumferential direction with respect to the aerosol generating device: on the other hand, the outer package of the aerosol generating substrate can rotate with the inner case along the circumferential direction and drive the aerosol-forming substrate and the heating body to be relatively moved in the circumferential direction. After the aerosol-forming substrate rotates synchronously with the inner case along circumferential direction for a sufficient distance, that is, after the aerosol-forming substrate moves a sufficient distance in the circumferential direction with respect to the heating body, and when the aerosol-forming substrate is pulled out from the heating body along the axial direction, the amount of aerosol-forming substrate remaining on the heating body will be less, which is more conducive for users to clean the aerosol generating device.

In summary, the aerosol-forming substrate being adhered to the heating body is released from the heating body during the relative movement in the circumferential direction between the aerosol-forming substrate and the heating body. The aerosol-forming substrate can be easily pulled out from the heating body by the user, which is convenient to use and also convenient for users to clean the aerosol generating device. Meanwhile, since the heating body and the aerosol-forming substrate are relatively moved in the circumferential direction and have no relative movement in the axial direction, the heating body have no movement in the axial direction during pulling out the aerosol-forming substrate, such that the stability of the connection between the heating body and the aerosol generating device is maintained and the life of the heating body is extended.

In order to make the above contents of the present invention more comprehensible, preferred embodiments are described in detail below with reference to accompanying drawings.

DETAILED DESCRIPTION

Figure 1:
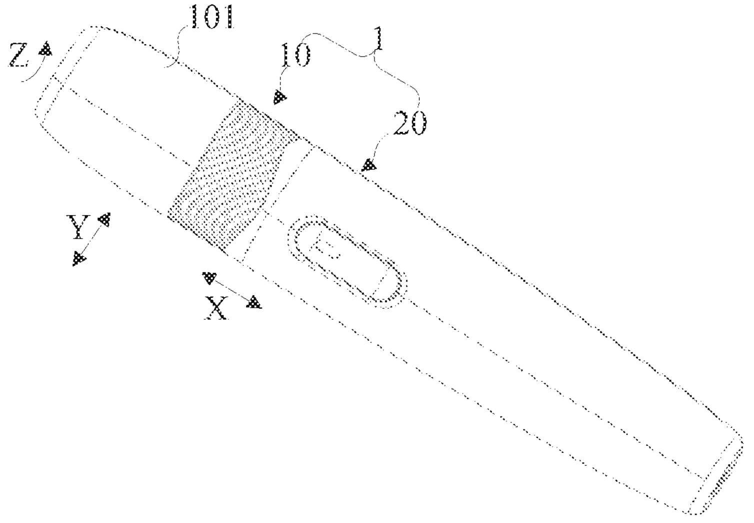
FIG. 1 is the first perspective view of the aerosol generating device in the embodiment of the present invention.

The embodiments of the present invention are described below by way of specific examples, and those skilled in the art can readily understand other advantages and functions of the present invention from the disclosure of the present specification. Although the description of the present invention will be described in conjunction with the preferred embodiments, the present invention is not limited thereto. Rather, the present invention is described in conjunction with the embodiments so as to cover other possible alternatives or modifications developed based on claims of the present invention. In order to provide a thorough understanding of the present invention, many specific details are included in the following description. In addition, some of specific details are omitted in the description in order to avoid confusing or obscuring key points of the present invention. It should be noted that in the case of no conflict, the embodiment of the invention and the features in the embodiments can be combined with each other.

Referring to FIG. 1 to FIG. 4, the present invention provides a releasing mechanism 10 for an aerosol generating device 1 provided with a heating body 23 that is used to be inserted into an aerosol-forming substrate (not shown in figures) placed on the releasing mechanism 10. Among them, the releasing mechanism 10 comprises: a rotary portion 101 comprising an outer case 14 and an inner case 11, wherein the outer case 14 is sleeved on the inner case 11 and the aerosol-forming substrate is placed on the inner case 11: a pressing mechanism 30 provided on the inner case 11, wherein the outer case 14 is movable along a circumferential direction (shown as the z-direction in FIG. 1 and FIG. 3), and the circumferential movement is transferred to movement along an axial direction (shown as the x-direction in FIG. 1 and FIG. 3) which coincides with an inserting direction of the heating body, to drive the pressing mechanism to apply a radial (shown as the y-direction in FIG. 1) pressing force to the aerosol-forming substrate. In addition, the inner case 11 is rotatably connected to the aerosol generating device 1 between a first position and a second position. The aerosol-forming substrate and the heating body 23 are relatively movable in the circumferential direction when switching from the first position to the second position: both in the first position and in the second position, the aerosol-forming substrate is in contact with the heating body 23.

When a user is suctioning, the aerosol-forming substrate is placed in an inner chamber 11*a* of the inner case 11, and the heating body 23 is inserted into the aerosol-forming substrate. At this time, the aerosol-forming substrate is in contact with the heating body 23, and the heating body 23 is controlled to heat the aerosol-forming substrate to generate an aerosol for the user to suction. When the user finishes suctioning, the outer case 14 is controlled to move along the circumferential direction before the aerosol-forming substrate is pulled out, and the circumferential movement will be transferred to the axial movement, so that the axial movement of the outer case 14 will drive the pressing mechanism 30 to apply a radial pressing force to the aerosol-forming substrate.

Under the radial pressing force, on the one hand, the inner case 11 can move in the circumferential direction with the outer case 14, and can be rotationally switched from the first position to the second position along the circumferential direction with respect to the aerosol generating device 1: on the other hand, the outer package of the aerosol-forming substrate can rotate with the inner case 11 along the circumferential direction, and drive the aerosol-forming substrate and the heating body 23 to be relatively moved in the circumferential direction. The aerosol-forming substrate cannot be easily separated from the outer package, preventing the aerosol-forming substrate from not rotating synchronously while the outer package of the aerosol-forming substrate is rotating synchronously with the inner case 11 along the circumferential direction. After the aerosol-forming substrate is rotated by a sufficient distance along the circumferential direction in synchronization with the inner case 11, that is, after the aerosol-forming substrate is moved by a sufficient distance along the circumferential direction with respect to the heating body 23, and when the aerosol-forming substrate is pulled out from the heating body 23 along the axial direction, the aerosol-forming substrate remaining on the heating body 23 will be less, which is more conducive for users to clean the aerosol generating device 1.

In summary, the aerosol-forming substrate being adhered to the heating body 23 is released from the heating body 23 during the relative movement in circumferential direction between the aerosol-forming substrate and the heating body 23. The aerosol-forming substrate can be easily pulled out from the heating body 23 by the user, which is convenient to use and also convenient for users to clean the aerosol generating device. Meanwhile, since the heating body 23 and the aerosol-forming substrate are relatively moved in the circumferential direction and have no relatively movement in the axial direction, the heating body 23 has no movement in the axial direction during pulling out the aerosol-forming substrate, such that the stability of the connection between the heating body 23 and the aerosol generating device is maintained, and the service life of the heating body 23 is extended.

In the embodiment of the present invention, the inner case 11 is rotationally switched from the first position to the second position along the circumferential direction (shown as the z-direction in FIG. 3) with respect to the aerosol generating device 1. The inner case 11 can perform a clockwise (shown as the B-direction in FIG. 2) rotation, perform a counterclockwise (shown as the A-direction in FIG. 2) rotation, or perform the clockwise rotation and the counterclockwise rotation alternately along the circumferential direction. During the process of the inner case 11 from the first position to the second position, the aerosol-forming substrate is in contact with and in connection with the heating body 30, and the aerosol-forming substrate and the heating body 23 are relatively movable in the circumferential direction (shown as the z-direction in FIG. 3).

The aerosol-forming substrate has a first axial position with respect to the heating body 23 in the first position: the aerosol-forming substrate has a second axial position with respect to the heating body 23 in the second position, and the first axial position is the same as the second axial position. That is, both in the first position and in the second position, the aerosol-forming substrate is in contact with the heating body 23 without relative movement in the axial direction. Preferably, the aerosol-forming substrate and the heating body 23 have no relative movement in the axial direction during switching from the first position to the second position.

In other embodiments, the first axial position may not be the same as the second axial position. During the rotation of the inner case with respect to the aerosol generating device, the aerosol-forming substrate is in contact with the heating body, and the heating body and the aerosol-forming substrate not only move in the circumferential direction but also move in the axial direction: just the aerosol-forming substrate and the heating body are relatively movable in the circumferential direction and the aerosol-forming substrate is in contact with the heating body during switching from the first position to the second position.

In addition, in the embodiment, during switching from the first position to the second position, the inner case 11 rotates along the circumferential direction, and the heating body 23 remains stationary: in other embodiments, the heating body may rotate along the circumferential direction, and the inner case may remain stationary. Just in the second position, the aerosol-forming substrate and the heating body are relatively moved in the circumferential direction. When the heating body 23 rotates along the circumferential direction, the heating body 23 may rotate synchronously with the aerosol generating device 1 at which the heating body 23 is located, or alternatively, the heating body 23 also may rotate while the aerosol generating device 1 at which the heating body 23 is located may remain stationary.

Additionally, a specific type of the aerosol-forming substrate of the present invention is not limited, as long as it can generate an aerosol for the user to suction after being heated by the heating body 23. The aerosol-forming substrate can be heated but not burned in the process of heating the aerosol-forming substrate by the heating body 23. For example, in the embodiment, the aerosol-forming substrate is a solid aerosol-forming substrate containing a tobacco component, and the aerosol-forming substrate is wrapped by an outer package (for example, an aluminum foil layer).

In addition, a specific shape of the heating body 23 is not limited. In the embodiment, the heating body 23 has a columnar shape with a circular cross section. In other embodiments, the heating body 23 may have a quadrilateral, triangular or polygonal cross section. As the number of sides of the cross section of the heating body 23 increases, the aerosol-forming substrate is more easily released from the heating body 23 during the relative movement in circumferential direction between the heating body 23 and the aerosol-forming substrate. When the aerosol-forming substrate is pulled out from the heating body 23, the amount of aerosol-forming substrate remaining on the heating body 23 is less, which is more advantageous for the user to clean the aerosol generating device 1.

A specific material of the heating body 23 is not limited, as long as it can generate heat after being energized, so as to heat the aerosol-forming substrate to generate an aerosol. For example, in the embodiment, the material of the heating body 23 comprises ceramic.

Additionally, in the embodiment, while the inner case 11 rotates synchronously from the first position to the second position along the circumferential direction, the inner case 11 is rotatable along the circumferential direction in synchronization with the outer case 14. In other embodiments, the outer case may not rotate synchronously with the inner case, as long as the aerosol-forming substrate and the heating body are relatively movable in the circumferential direction, or alternatively in the process of the circumferential rotation of the outer case, at least part of the process is that the inner shell rotates synchronously with the outer shell. In the embodiment, the aerosol-forming substrate is subjected to a radial pressing force during the process from the first position to the second position.

Figure 2:
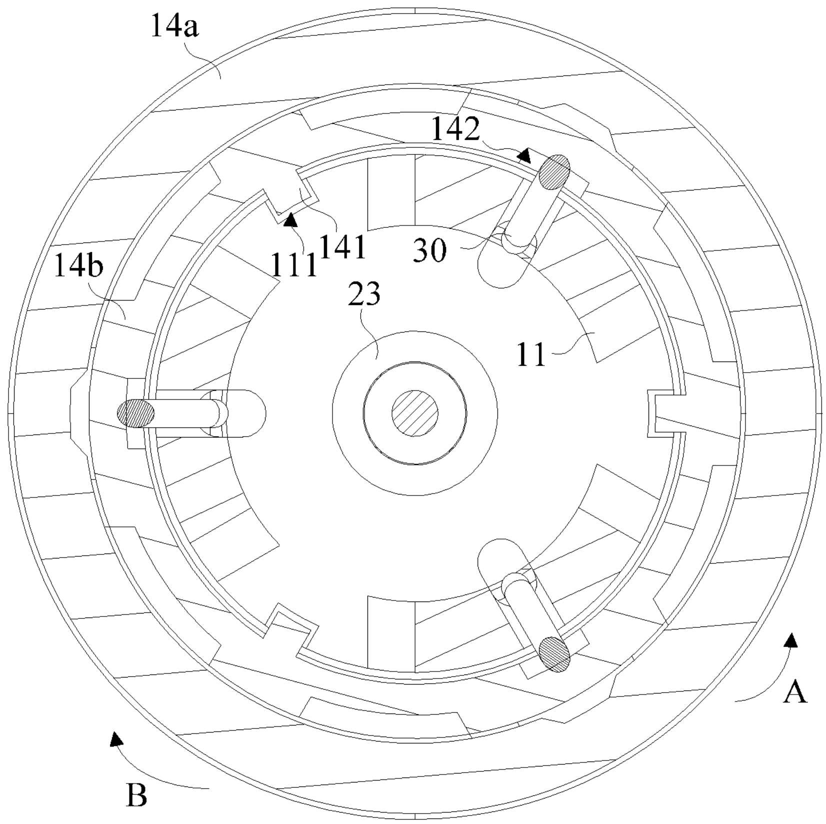
FIG. 2 is a top view of the aerosol generating device in the embodiment of the present invention.
Figure 5:
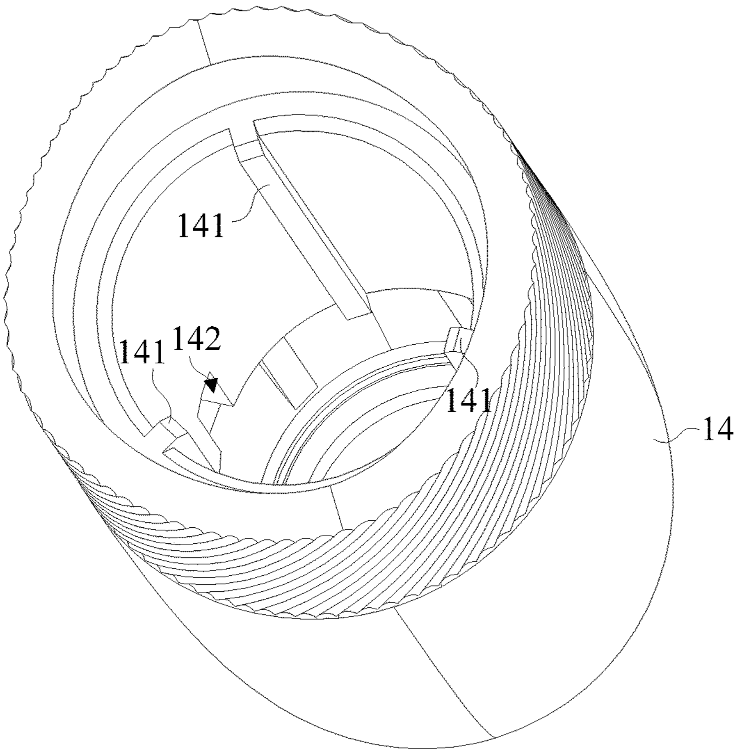
FIG. 5 is a perspective view of the outer case of the rotary portion of the releasing mechanism in the embodiment of the present invention.

Referring to FIG. 5, the inner circumferential surface of the outer case 14 is provided with a convex component 141 and the amount of the convex component 141 is not limited. In the embodiment, three convex components 141 are provided on inner circumferential surface of the outer case 14 and spaced apart along the circumferential direction: referring to FIG. 3, the outer circumferential surface of the inner case 11 is provided with the first groove 111 extending along the axial direction (shown as the x-direction in FIG. 3) and the amount of the first groove 111 is not limited. In the embodiment, three first grooves 111 are provided on the outer circumferential surface of the inner case 11 and spaced apart along the circumferential direction. Referring to FIG. 2, the convex components 141 are disposed in the first grooves 111, so that the inner case 11 is rotatable along the circumferential direction in synchronization with the outer case 14 while the inner case 11 rotates synchronously from the first position to the second position along the circumferential direction. In other embodiments, the inner circumferential surface of the outer case may be provided with the first groove extending along the axial direction and the outer circumferential surface of the inner case may be provided with the convex component disposed in the first groove.

In the present embodiment, the convex component 141 extends along the axial direction. However, the extending direction of the convex component is not limited, as long as the inner case is rotatable along the circumferential direction in synchronization with the outer case after the convex component is disposed in the first groove. In addition, the matching form between the inner case and the outer case is not limited to using the convex component and the first groove. Other matching forms may also be used as long as the inner case can rotate synchronously with the outer case along the circumferential direction.

Figure 3:
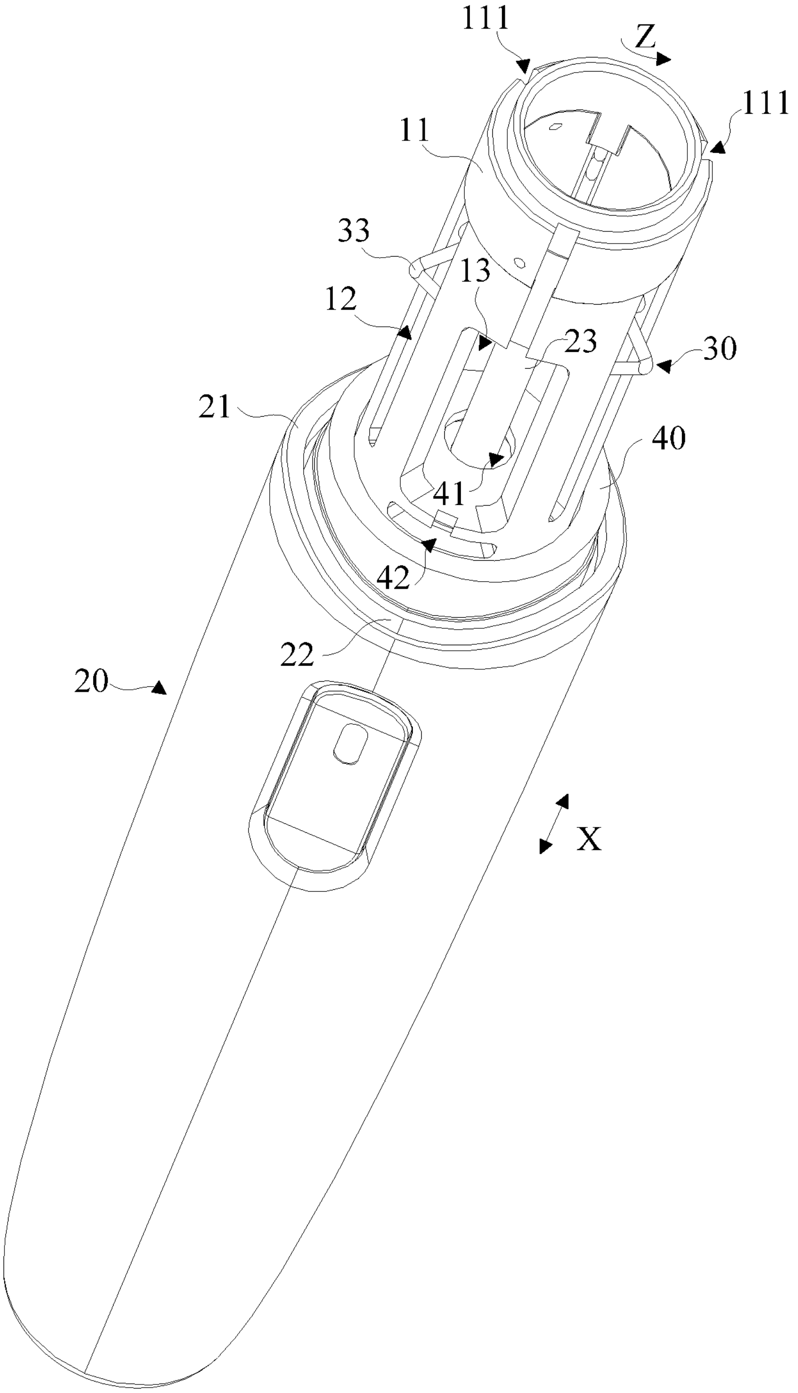
FIG. 3 is the second perspective view of the aerosol generating device in the embodiment of the present invention.
Figure 4:
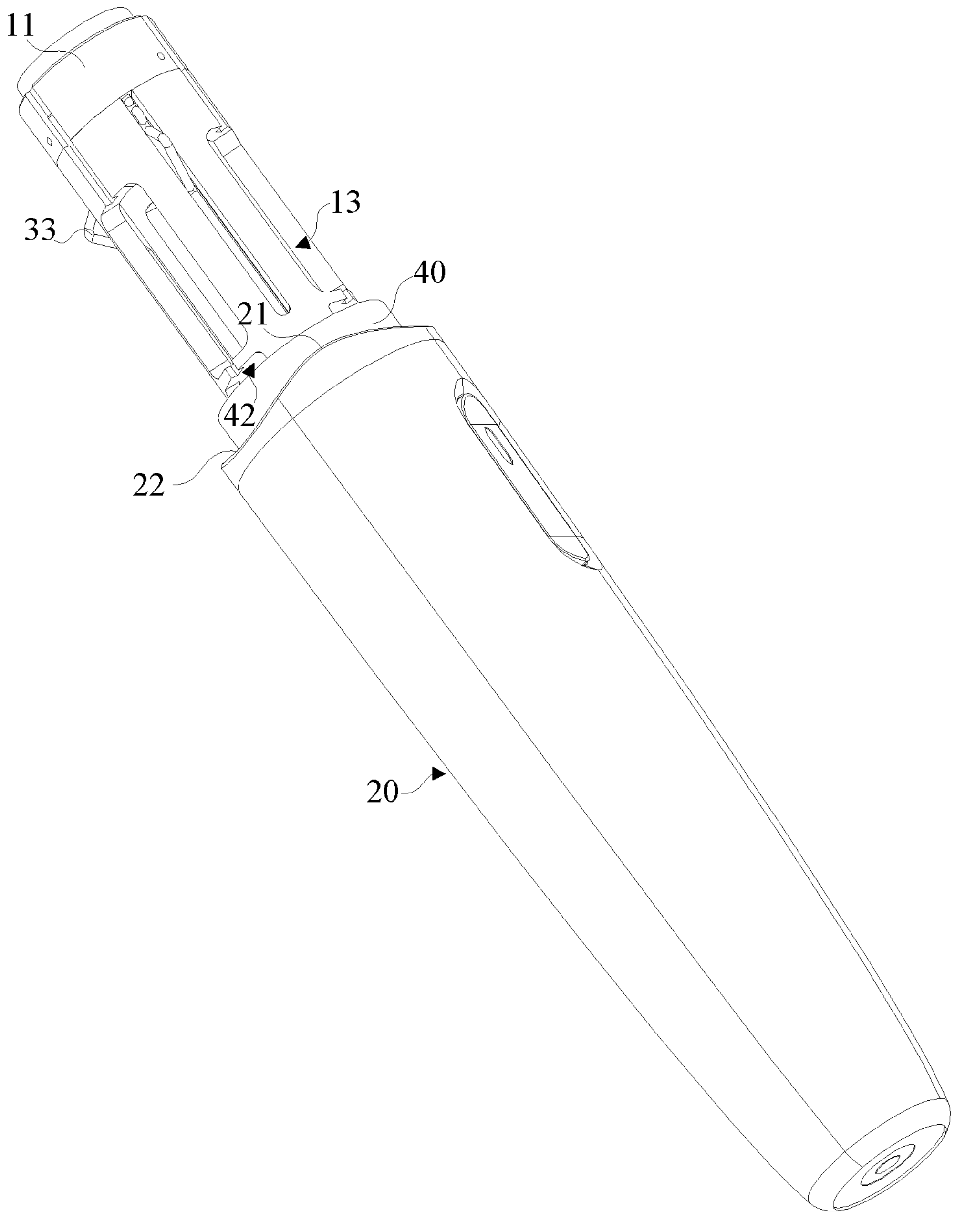
FIG. 4 is the third perspective view of the aerosol generating device in the embodiment of the present invention.
Figure 6:
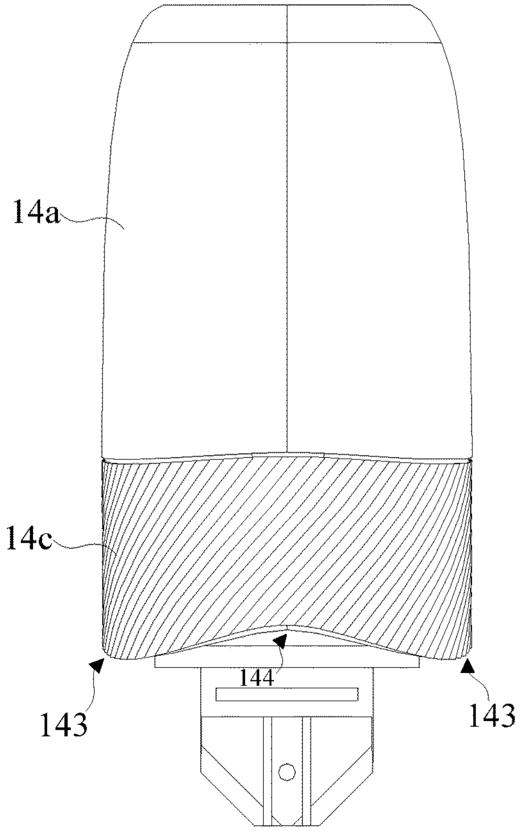
FIG. 6 is the first side view of the releasing mechanism in the embodiment of the present invention.
Figure 7:
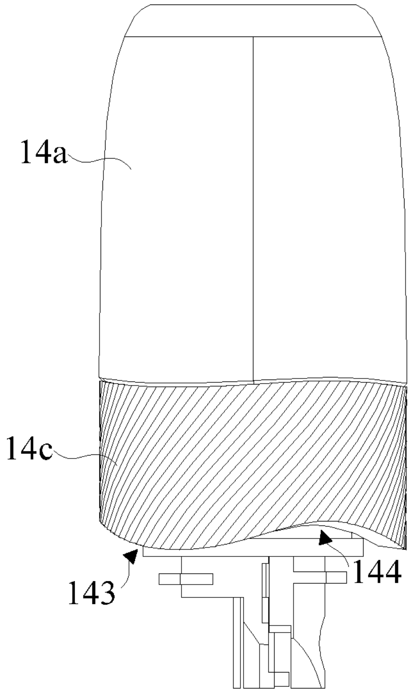
FIG. 7 is the second side view of the releasing mechanism in the embodiment of the present invention.

Specifically, referring to FIG. 6 and FIG. 7, the outer case 14 has a first end facing the aerosol generating device 1 along the axial direction: referring to FIG. 3 and FIG. 4, the aerosol generating device 1 has a second end facing the outer case 14. Preferably, the shape of the first end matches the shape of the second end. In the embodiment, the first end comprises a first convex portion 143 and a first concave portion 144 which are provided alternately, and the second end comprises a second convex portion 21 and a second concave portion 22 which are provided alternately: The shape of the first convex portion 143 matches with the shape of the second concave portion 22, and the shape of the second convex portion 21 matches with the shape of the first concave portion 144.

As shown in FIG. 1, since the shape of the first convex portion 143 matches with the shape of the second concave portion 22 and the shape of the second convex portion 21 matches with the shape of the first concave portion 144, the first convex portions 143 can fit with the second concave portions 22 and the second convex portions 21 can fit with the first concave portions 144 along the axial direction (shown as an X direction in FIG. 1). The highest point of the first convex portion 143 matches with the lowest point of the second concave portion 22 and the highest point of the second convex portion 21 matches the lowest point of the first concave portion 144, so that gaps will neither occur between the first convex portion 143 and the second concave portion 22, nor occur between the second convex portion 21 and the first concave portion 144 in the axial direction.

When the user is suctioning, the aerosol-forming substrate is placed in the inner chamber 11*a* of the inner case 11, and the heating body 23 is inserted into the aerosol-forming substrate. At this time, the first convex portions 143 fit with the second concave portions 22 and the second convex portions 21 fit with the first concave portions 144. When the user finishes suctioning, the outer case 14 is controlled to move along the circumferential direction before the aerosol-forming substrate is pulled out, so that the first convex portions 143 and the first concave portions 144 move in the circumferential direction. During this process, the highest points of the first convex portions 143 will be separated from the lowest points of the second concave portions 22, and the highest points of the second convex portions 21 will be separated from the lowest points of the first concave portions 144: the first convex portions 143 and the first concave portions 144 will move along the surface of the second convex portions 21 and the second concave portions 22, and then gaps occur in the axial direction between the first convex portions 143 and the second concave portions 22, as well as between the second convex portions 21 and the first concave portions 144. So, the circumferential movement of the outer case 14 will be transferred to movement along an axial direction.

While the first convex portions 143 move from the lowest points of the second concave portions 22 to the highest points of the second convex portions 21, the outer case 14 will move away from the second end in the axial direction. While the first convex portions 143 move from the highest points of the second convex portions 21 to the lowest points of the second concave portions 22, the outer case 14 will move towards the second end in the axial direction. Equivalently, the circumferential movement of the outer case 14 will be transformed into upwards and downwards reciprocating movement of the outer case 14 in the axial direction. When the first convex parts 143 has been fit with the second concave portions 22 again, the second convex parts 21 has been fit with the first concave parts 144 again, no gap exists between the first convex parts 143 and the second concave portions 22, and no gap exists between the second convex parts 21 and the first concave parts 144, the outer case 14 will not move in the axial direction. The outer case 14 is rotated sequentially to proceed with the reciprocating movement in the axial direction, so that the radial pressing force can be fully applied to the aerosol-forming substrate by the pressing mechanism 30, and it is convenient for the aerosol-forming substrate and the heating body 23 to produce relative movement in the circumferential direction.

In other embodiments, one of the first end and the second end comprises the first convex portion and the other comprises the second concave portion. The first convex portion matches with the second concave portion. For example, the first end comprises the first convex portion, and the second end comprises the second concave portion, wherein the shape of the first convex portion of the first end matches with the shape of the second concave portion of the second end, and the first convex portion cooperates with the second concave portion. In addition, the portion of the first end apart from the first convex portion and the portion of the second end apart from the second concave portion are flat-surface portions that can match with each other. This matching form of the first end and the second end can also be used to achieve the purpose of moving the outer case along the circumferential direction and transferring the circumferential movement to the axial movement.

In the embodiment, the circumferential movement of the outer case 14 is transferred to the axial movement by matching the first convex parts 143 with the second concave parts 22 and matching the second convex parts 21 with the first concave parts 144. Other matching forms may also be used, as long as the circumferential movement can be transferred to the axial movement. For example, in other embodiments, the outer case is screwed with the aerosol generating device, which is equivalent to that one of the outer case and the aerosol generating device is provided with an external thread on its outer circumferential surface, the other is provided with an internal thread on its inner circumferential surface, so that the outer case can be screwed with the aerosol generating device. The circumferential movement is transferred to the axial movement by rotating the outer case.

Or alternatively in other embodiments, the outer surface of the inner case is provided with a spiral groove extending along the axial direction, and the inner surface of the outer case is provided with a convex part, wherein the convex part is disposed in the spiral groove and is slidable within the spiral groove. When the outer case moves in the circumferential direction, the convex part will slide in the spiral groove, so that the circumferential movement of the outer case can be transferred to axial movement.

Figure 8:
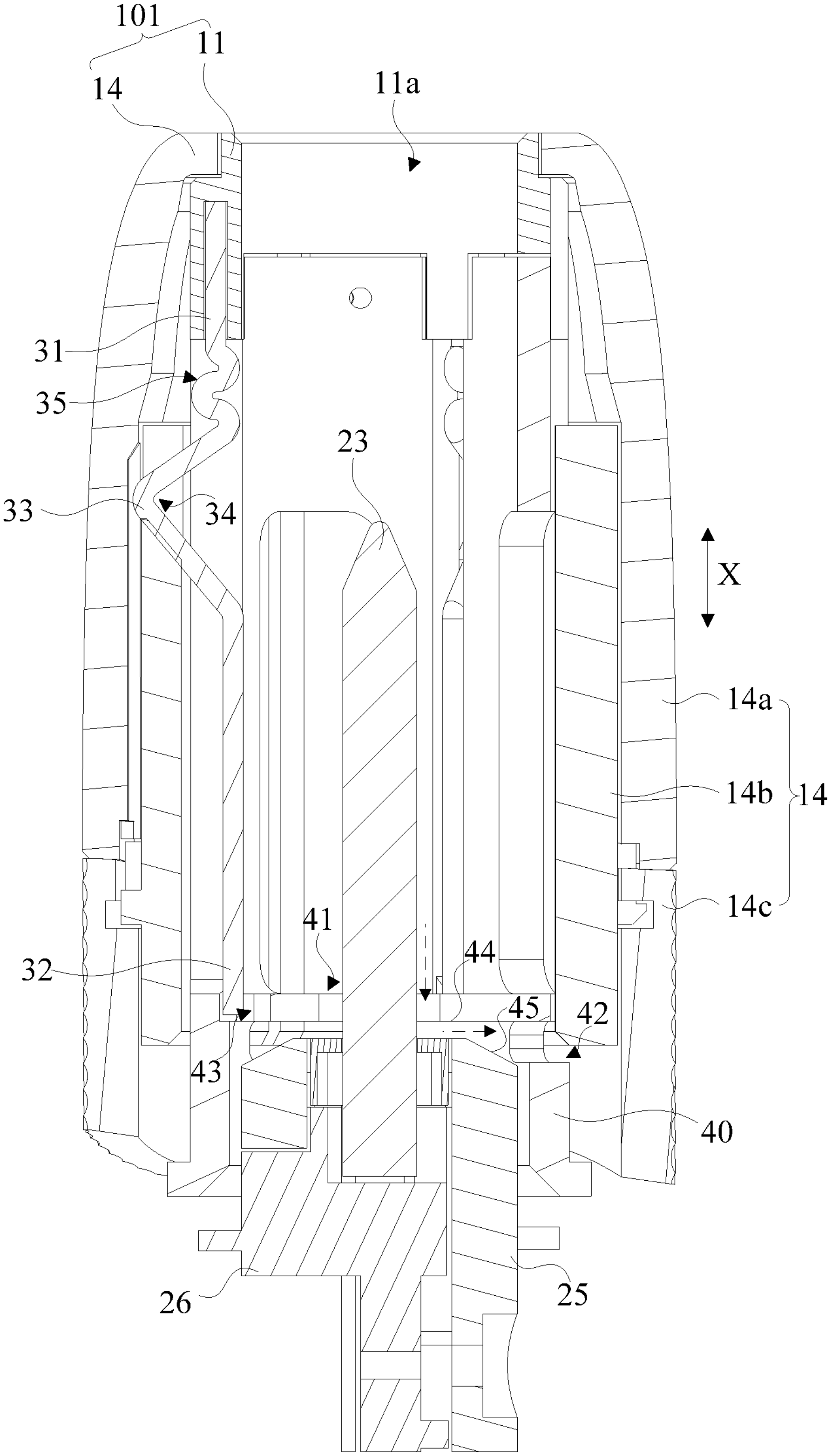
FIG. 8 is a section view of the releasing mechanism in the embodiment of the present invention.

Referring to FIG. 3, the inner case 11 is provided with at least one first through-hole 12 connecting with the inner chamber 11*a* of the inner case 11 and extending along the axial direction. In the embodiment, three first through-holes 12 are provided. In other embodiments, other amount of the first through-hole may be selected. Referring to FIG. 8, the pressing mechanism 30 is provided in the inner chamber 11*a* of the inner case 11, and is provided with a first end 31 and a second end 32 along the axial direction (shown as the x-direction in FIG. 8), wherein the first end 31 is closer to an opening of the inner case 11 than the second end 32 in the axial direction. In the embodiment, the first end 31 is connected fixedly with the inner case 11 and the second end 32 is connected flexibly with the inner case 11. In other embodiments, the first end may be connected flexibly with the inner case and the second end may be connected fixedly with the inner case, or alternatively both the first end and the second end may be connected fixedly with the inner case.

In the embodiment, the portion between the first end 31 and the second end 32 is used for applying the radial pressing force to the aerosol-forming substrate: a convex portion 33 is provided between the first end 31 and the second end 32, and the convex portion 33 protrudes from the first through-hole 12 toward the inner wall of the outer case 14.

When the outer case 14 moves in the axial direction, the inner wall of the outer case 14 will press the convex part 33. Since the first end 31 is connected fixedly with the inner case 11 and the second end 32 is connected flexibly with the inner case 11, the pressed convex part 33 will drive the portion between the first end 31 and the second end 32 to move towards the aerosol-forming substrate along the radial direction after being squeezed, so as to apply the radial pressing force to the aerosol-forming substrate.

In addition, after the aerosol-forming substrate has been suctioned, if the smoking product is pulled out without operating the pressing mechanism 30, the aerosol-forming substrate will be separated from the outer package of the smoking product and stick to the heating body 23, because the friction force between the aerosol-forming substrate of the smoking product and the outer package is smaller than the adhesive force between the aerosol-forming substrate and the heating body. In this case, the convex part 33 can be pressed to drive the portion between the first end 31 and the second end 32 to move towards the aerosol-forming substrate along the radial direction, so as to apply the radial pressing force to the aerosol-forming substrate. As a result, the aerosol-forming substrate will be crushed, which is convenient for separating the aerosol-forming substrate from the heating body 23 to clean the heating body 23.

The inner wall of the outer case 14 may have inner diameters with a larger size on the top and a smaller size on the bottom. The convex part 33 is in contact with the portion of the inner wall of the outer case 14 with a larger inner diameter at the initial state, and the convex portion 33 is in contact with the portion of the inner wall of the outer case 14 with a smaller inner diameter when the outer case 14 moves in the axial direction, so that the inner wall of the outer case 14 will press the convex part 33. The inner wall of the outer case 14 is not limited to a specific shape, as long as the inner wall of the outer case 14 can press the convex part 33 so that the pressing mechanism 30 can apply the radial pressing force to the aerosol-forming substrate when the outer case 14 moves in the axial direction.

Referring to FIG. 8, in the embodiment, the portion between the first end 31 and the convex part 33 is provided with a curved portion 35 with at least one curved section. The curved portion 35 in the present embodiment is provided with three curved sections. When the convex part 33 is pressed by the inner wall of the outer case 14, the pressing mechanism 30 will be deformed elastically along the radial direction. Provided with the curved portion 35, the curved structure of the curved portion 35 can disperse the elastic displacement caused by the pressing mechanism 30, so that the curved portion 35 will have less deformation and the service life of the pressing mechanism 30 will be extended. The portion between the second end and the convex part is in a shape of a bar, without being curved.

In other embodiments, the portion between the second end and the convex part is provided with the curved portion mentioned above, and the portion between the first end and the convex part is in a shape of a bar, without being curved. Or alternatively: the portion between the first end and the convex part is provided with the curved portion mentioned above, and the portion between the second end and the convex part is also provided with the curved portion mentioned above. Or alternatively, the portion between the first end and the convex part is in a shape of a bar, without being curved, and the portion between the second end and the convex part is also in a shape of a bar, without being curved.

In the present embodiment, the convex part 33 is abutted against the inner wall of the outer case 14. The convex part 33 is pressed immediately when the outer case 14 moves in the axial direction, so the aerosol-forming substrate is subjected to the radial pressing force immediately. In other embodiments, the convex part is not abutted against the inner wall of the outer case. Additionally, when the convex part 33 is abutted against the inner wall of the outer case 14, there is an elastic force between the convex part 33 and the inner wall of the outer case 14 along the radial direction. Under the elastic force, the outer case 14 cannot move easily in the axial direction unless an external force is applied to the outer case 14, for example when the user rotates the outer case 14 in the circumferential direction. This is equivalent to that the elastic force has a limiting effect in the axial direction, preventing the outer case 14 from falling off along the axial direction with respect to the inner case 11. In addition, the outer case 14 and the inner case 11 can also be maintained by the elastic force when rotating in the circumferential direction, that is the outer case 14 and the inner case 11 can rotate stably along the circumferential direction.

In other embodiments, there may be no elastic force between the convex part and the inner wall of the outer case at the initial state. At the meantime, there is an elastic force between the convex part 33 and the inner wall of the outer case 14, which helps the outer case 14 press the convex part 33 after the outer case 14 moves in the axial direction, so that the pressing mechanism 30 can further apply the radial pressing force to the aerosol-forming substrate.

Referring to FIG. 5, the inner wall of the outer case 14 is provided with a second groove 142 in which the convex part 33 is disposed, achieving a further limiting effect in the axial direction. In addition, provided with the second groove 142, the outer case 14 will apply a force to the convex part 33 when the outer case 14 moves in the circumferential direction, so the convex part 33 will tend to move in the circumferential direction so as to drive the inner case 11 to move in the circumferential direction. Under the radial pressing force, the aerosol-forming substrate and the inner case 11 will move synchronously in the circumferential direction and move with respect to the heating body 23, which is advantageous for separating the heating body 23 from the aerosol-forming substrate in the circumferential direction, makes the aerosol-forming substrate remaining on the heating body 23 in a less amount, and is easier for the user to clean the aerosol generating device 1.

The inner wall of the second groove 142 may have inner diameters with a larger size on the top and a smaller size on the bottom. The convex part 33 is in contact with the portion of t the inner wall of the second groove 142 with a larger inner diameter at the initial state, and the convex portion 33 is in contact with the portion of t the inner wall of the second groove 142 with a smaller inner diameter when the outer case 14 moves in the axial direction, so that the second groove 142 will press the convex part 33. The inner wall of the second groove 142 is not limited to a specific shape, as long as the second groove 142 can press the convex part 33 so that the pressing mechanism 30 can apply the radial pressing force to the aerosol-forming substrate when the outer case 14 moves in the axial direction.

In addition, provided with the second groove 142, the inner case 11 and the outer case 14 can also rotate synchronously without the convex component 141 and the first groove 111. For example, the convex part 33 is disposed behind the second groove 142, the convex part 33 will not be separated from the second groove 142 when the outer case 14 moves in the axial direction, and will be driven to move in circumferential direction by the second groove 142. In other embodiments, both the convex component and the first groove can be provided.

Referring to FIG. 8, in the embodiment, the inner case 11 comprises a base 40 provided with a concave part 43, wherein the second end 32 is inserted into the concave part 43. Preferably, the concave part 43 goes through the base 40 along the axial direction. After the second end 32 is inserted into the concave part 43, the second end 32 will not be separated from the concave part 43 while the outer case 14 presses the convex part 33, which ensures a certain degree of freedom of the pressing mechanism 30 and is advantageous for the outer case 14 to move in the axial direction to drive the pressing mechanism 30 to apply the radial pressing force to the aerosol-forming substrate.

Referring to FIG. 8, in the embodiment, the rear surface of the convex portion 33 is a concave surface 34. The design of the concave surface 34 is advantageous for the convex portion 33 to be pressed by the outer case 14, so that the pressing mechanism 30 can apply a radial pressing force to the aerosol-forming substrate. In addition, the portion between the first end 31 and the second end 32 facing the aerosol-forming substrate is a flat surface. Specifically, the portion between the concave surface 34 and the second end 32 facing the aerosol-forming substrate can be a flat surface. The design of the flat surface can make the contact area of the pressing mechanism 30 and the aerosol-forming substrate large and can make the radial pressing force large.

In the present embodiment, three pressing mechanisms 30 are provided and spaced apart along the circumferential direction. In other embodiments, other amount of the pressing mechanism may be selected. After increasing the contact area, a plurality of the pressing mechanisms 30 can be provided and spaced apart along the circumferential direction so that the pressure can be uniformly distributed on the aerosol-forming substrate, which is advantageous for the aerosol-forming substrate to move synchronously with the inner case 11 along the circumferential direction.

In other embodiments, the portion between the first end and the second end facing the aerosol-forming substrate is provided with a convex part (not shown in figures). The convex part can be used for clamping the aerosol-forming substrate and applying the radial pressing force to the aerosol-forming substrate.

Referring to FIG. 3 and FIG. 4, in the embodiment, the inner case 11 is provided with at least one second through-hole 13 connecting with the inner chamber 11*a* of the inner case 11 and extending along the axial direction. The heating body 23 is exposed by the second through-hole 13. The amount of the second through-hole 13 is not limited. In the present embodiment, at least two second through-holes 13 are provided and spaced apart along the circumferential direction. Provided with the second through-holes 13, after the aerosol-forming substrate has been removed, it is easier to use a brush (not shown in figures) to clean the heating body 23 through the second through-holes 13.

In the embodiment, the outer case 14 is detachably connected to the inner case 11. When the heating body 23 needs cleaning, the outer case 14 is moved along the axial direction with respect to the inner case 11, and the force applied to the outer case 14 can overcome the elastic force present between the convex part 33 and the outer case 14, making the outer case 14 separate from the inner case 11. After the outer case 14 has been dismantled, the second through-hole 13 is exposed, so that a brush (not shown in figures) can be used to clean the heating body 23.

In addition, the releasing mechanism 10 of the present invention further comprises a structure for debris discharge which allows the debris in the inner case 11 to flow out. Referring to FIG. 3 and FIG. 4, in the embodiment, the structure for debris discharge comprises an inclined hole 42, and the inclined hole 42 can guide the debris in the inner case to flow out through the inclined hole 42.

Specifically, referring to FIG. 3 and FIG. 4, and as shown by combining with FIG. 8, the structure for debris discharge comprises the third through-hole 41 provided on the base 40, and the inclined hole 42 connects the third through-hole 41. In the embodiment, the third through-hole 41 is provided around the heating body 23 and spaced apart from the heating body 23 in the radial direction. The outer circumferential surface of the base 40 is provided with at least one inclined hole 42 connected to the third through-hole 41, and the inclined hole 42 can guide the debris in the third through-hole 41 to flow out. Without the inclined hole 42, it would be difficult to clean the debris (in the third through-hole 41) if the debris falls into the third through-hole 41. Provided with the inclined hole 42, as shown by the track of the dashed arrow in FIG. 8, the debris in the third through-hole 41 can flow out by following the inclined hole 42, which is easy for cleaning. In other embodiments, the third through-hole 41 is provided on the other portion of the base 40 rather than around the heating body, but still connected to the inclined hole.

Referring to FIG. 8, the inclined hole 42 comprises a first surface 44 and a second surface 45 opposed to each other. The first surface 44 is the surface of the base 40 facing the fixed seat 25 mentioned later, and the second surface 45 is the surface of the fixed seat 25 mentioned later facing the base 40. So, the passage for debris discharge of the inclined hole 42, connecting to the third through-hole 41, consists of the upper surface of the fixed seat 25 and the lower surface of the base 40. That is, the passage for debris discharge of the inclined hole 42 is formed by the fixed seat 25 and the base 40 together. In other embodiments, the passage for debris discharge of the inclined hole is formed by the base, that is, both of the first surface and the second surface are provided on the base.

In the embodiment, the third through-hole 41 is provided on the plane of the first surface 44, and the plane of the second surface 45 is set at an acute angle with the plane of the first surface 44. In the embodiment, the acute angle ranges from 30 degrees to 60 degrees, including 30 degrees and 60 degrees, and it may also be 43.5 degrees. Within this range of the angle, it is advantageous for the debris in the third through-hole 41 to flow out from the inclined hole 42.

In addition, referring to FIG. 8, in the embodiment, the outer case 14 comprises a body portion of the outer case and an inner lining 14*b*, wherein the inner lining 14*b* is provided around the inner circumferential surface of the body portion of the outer case along the circumferential direction. As shown by combining with FIG. 6 and FIG. 7, the body portion of the outer case comprises a first annular component 14*a* and a second annular component 14*c* that are connected with each other, and the second annular component 14*c* is closer to the aerosol generating device compared to the first annular component 14*a*. That is, in the present embodiment, the outer case 14 is formed by the first annular component 14*a*, the second annular component 14*c* and the inner lining 14*b* together, which is convenient for machining separately and then assembly to form the outer case 14. The type of connection of the first annular component 14*a*, the second annular component 14*c* and the inner lining 14*b* is not limited, which may be adhesive bonding, fastening, hot melting, welding, etc, as long as the three components can be fixed together to form the outer case.

The inner wall of the outer case 14 mentioned above is the inner wall of the inner lining 14*b*, and the structure on the inner wall of the outer case 14 mentioned above is the structure on the inner wall of the inner lining 14*b*. That is, the inner wall of the inner lining 14*b* is provided with the second groove 142 and the convex components 141. The second annular component 14*c* is provided with the first end mentioned above. In addition, in the present embodiment, the second annular component 14*c* has a bumpy surface, increasing the friction on the surface of the second annular component 14*c*, which is advantageous for the user to hold the second annular component 14*c* to rotate the outer case 14 in the circumferential direction.

In other embodiments, the outer case is formed integrally.

Referring to FIG. 1 to FIG. 4, the embodiment of the present invention is further provided with the aerosol generating device 1, comprising the heating body 23 used to be inserted into the aerosol-forming substrate placed on the releasing mechanism 10 mentioned above, and a body portion of the device 20 on which the heating body 23 is provided. The inner case 11 is connected to the body portion of the device 20 rotatably in the circumferential direction, or alternatively the inner case 11 is connected to the heating body 23 rotatably in the circumferential direction. So, when the inner case 11 rotates along the circumferential direction, the heating body 23 will remain at rest: or alternatively, when the heating body 23 rotates along the circumferential direction, the body portion of the device 20 will not rotate synchronously with the heating body 23 and the inner case 11 will remain at rest. In either way, the aerosol-forming substrate and the heating body 23 are relatively movable in the circumferential direction (shown as the Z direction in FIG. 1).

Figure 9:
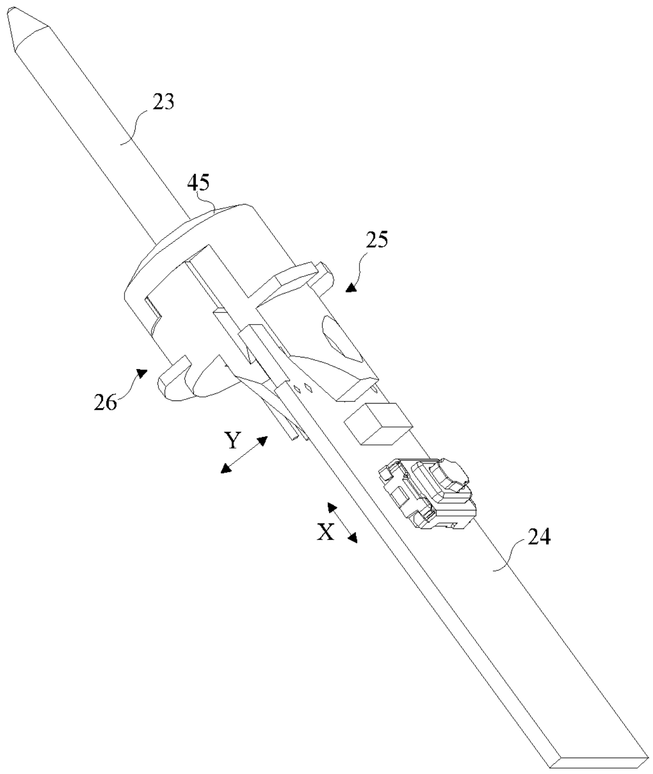
FIG. 9 is the first perspective view of the heating components of the aerosol generating device in the embodiment of the present invention.
Figure 10:
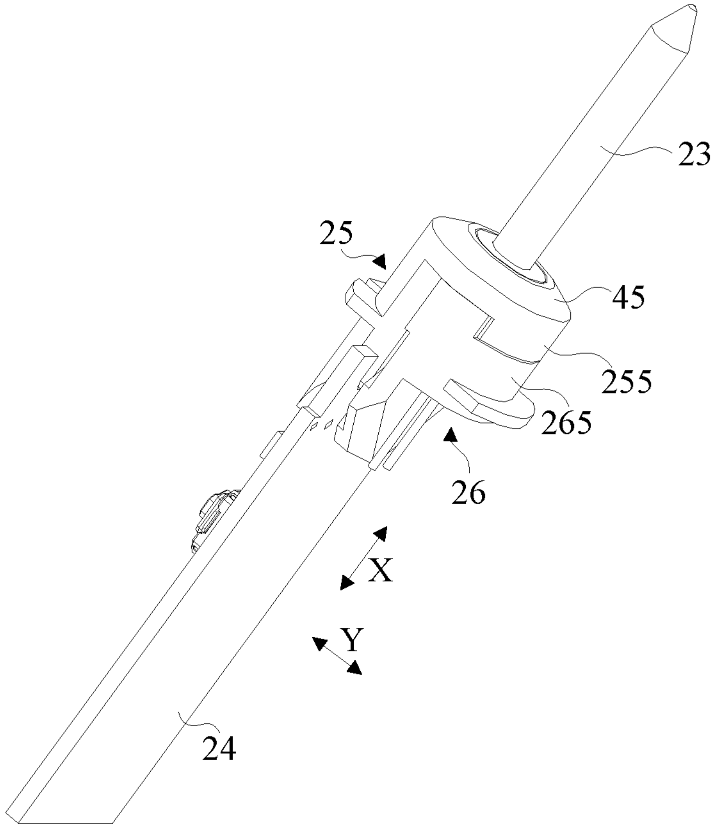
FIG. 10 is the second perspective view of the heating components of the aerosol generating device in the embodiment of the present invention.

Referring to FIG. 9 and FIG. 10, the body portion 20 of the aerosol generating device 1 is further provided with heating components comprising the fixed seat 25, wherein the body portion of the device 20 comprises the fixed seat 25 with the accommodating portion 252 on which the mounting portion 27 of the heating body 23 is mounted. The accommodating portion 252 is used for limiting the circumferential movement of the mounting portion 27. Specifically, referring to FIG. 11 and FIG. 12, the fixed seat 25 comprises the accommodating portion 252 and the fourth through-hole 253 along the axial direction (shown as the X direction in FIG. 11): the heating body 23 is disposed on the mounting portion 27. In the embodiment, the heating body 23 goes through the fourth through-hole 253 along the direction from the accommodating portion 252 to the fourth through-hole 253 (shown as the C direction in FIG. 12). The mounting portion 27 is mounted on the accommodating portion 252 which is used for limiting the circumferential movement of the mounting portion 27. The fixed seat 25 is mounted on a circuit control board 24 which is electrically connected to the heating body 23.

It should be noted that, the installation direction of the heating body 23 is not limited, as long as the heating body 23 can be mounted on the accommodating portion 252 that can limit the circumferential movement of the mounting portion 27. In addition, the fixed seat 25 is not limited to a specific structure, as long as it can limit the circumferential movement of the mounting portion 27.

With such configuration, the assembly will be convenient and quantity production can be achieved during the production process. The heating components are assembled as an assembly part as a whole, so confusion and mismatching of parts will not occur.

In the embodiment, the inner circumferential surface of the mounting portion 27 of the heating body 23 is fit with the outer circumferential surface of the heating body 23, and the inner circumferential surface of the mounting portion 27 is spaced apart from the heating body 23 in the radial direction.

In addition, referring to FIG. 10, the heating components further comprise a limiting portion 26 mounted on the fixed seat 25 along the axial direction (shown as the X direction in FIG. 10). The mounting portion 27 is disposed between the limiting portion 26 and the accommodating portion 252, and the limiting portion 26 is used for limiting the axial movement of the mounting portion 27. As the axial movement and the circumferential movement of the mounting portion 27 are limited, the axial movement and the circumferential movement of the heating body 23 are also limited, which makes the heating body 23 easy to be mounted and make the connection stable.

Figure 13:
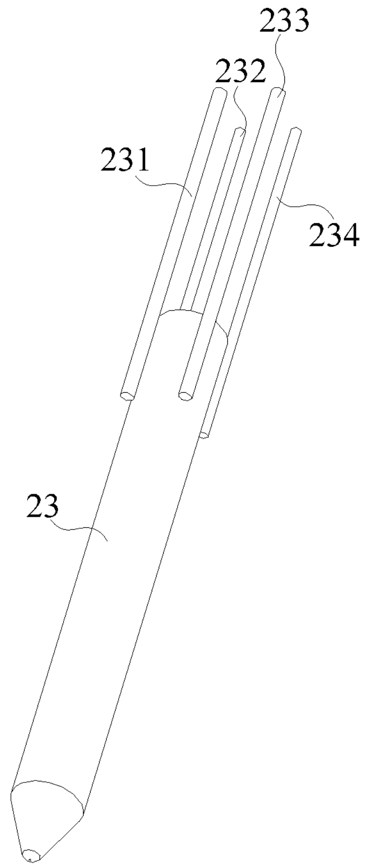
FIG. 13 is a perspective view of the heating body of the heating components in the embodiment of the present invention.
Figure 14:
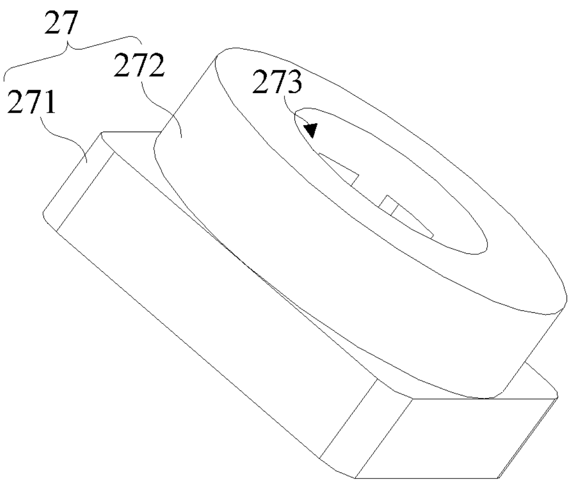
FIG. 14 is the first perspective view of the mounting portion of the heating components in the embodiment of the present invention.

In the present invention, the cross sections of the mounting portion 27 and the accommodating portion 252 are not in a shape of a circle, so that the circumferential movement of the mounting portion 27 will be limited after the mounting portion 27 is disposed in the accommodating chamber 254 of the accommodating portion 252. Specifically, referring to FIG. 11. FIG. 13 and FIG. 14, the mounting portion 27 and the accommodating portion 252 have polygonal cross sections. In the present invention, the mounting portion 27 and the accommodating portion 252 have square cross sections. In other embodiments, the cross section may be in a triangular, quadrilateral or other polygonal shapes. The accommodating portion 252 has a square accommodating chamber 254. After the mounting portion 27 is disposed in the accommodating chamber 254 of the accommodating portion 252, the circumferential movement will be limited.

Specifically, in the direction from the accommodating portion 252 to the fourth through-hole 253 (shown as the C direction in FIG. 12), the mounting portion 27 comprises the first part 271 and the second part 272. The first part 271 is mounted on the accommodating chamber 254 of the accommodating portion 252, and the second part 272 is mounted on the fourth through-hole 253. The outer circumferential surface of the second part 272 is fit with the inner circumferential surface of the fourth through-hole 253. In the embodiment, the cross sections of the first part 271 and the accommodating portion 252 are not in a shape of a circle, wherein the first part 271 and the accommodating chamber 254 of the accommodating portion 252 have polygonal cross sections. In the embodiment, the first part 271 and the accommodating chamber 254 of the accommodating portion 252 have quadrilateral cross sections: the second part 272 and the fourth through-hole 253 may have circular cross sections, or alternatively the second part 272 and the fourth through-hole 253 may not have circular cross sections. With such configuration, after the mounting portion 27 is disposed in the accommodating portion 252, the circumferential movement of the mounting portion 27 will be limited, and the circumferential movement of the heating body 23 will also be limited. In other embodiments, in the direction from the accommodating portion to the fourth through-hole, the mounting portion comprises the first part and the second part, and the accommodating portion comprises the third part and the fourth part, wherein the first part is mounted on the third part and the second part is mounted on the fourth part. The cross sections of the first part and the third part are in a shape such as a polygon rather than in a shape of a circle. The cross sections of the second part and the fourth part may be in a shape of a circle, or alternatively the cross sections of the second part and the fourth part may not be in a shape of a circle. With such configuration, after the mounting portion is disposed in the accommodating portion, the circumferential movement of the mounting portion will be limited, and the circumferential movement of the heating body will also be limited.

Referring to FIG. 13, in the embodiment of the present invention, the heating components further comprise the wires. The mounting portion 27 is provided with the through-hole 28 for the wires to pass through. In the embodiment, the wires further comprise: a first anode wire 231, one end of which is connected to the circuit control board 24 and the other end is connected to the resistance element (not shown) in the heating body 23: a first cathode wire 233, one end of which is connected to the circuit control board 24 and the other end is connected to the resistance element in the heating body 23: a second anode wire 232, one end of which is connected to the circuit control board 24 and the other end is connected to the temperature sensing element in the heating body 23: and a second cathode wire 234, one end of which is connected to the circuit control board 24 and the other end is connected to the temperature sensing element in the heating body 23. With such configuration, the heating circuit and the temperature sensing circuit of the heating components are provided separately, which makes it easy to control separately: has less mutual interference, and makes heating and temperature control more precise.

Figure 15:
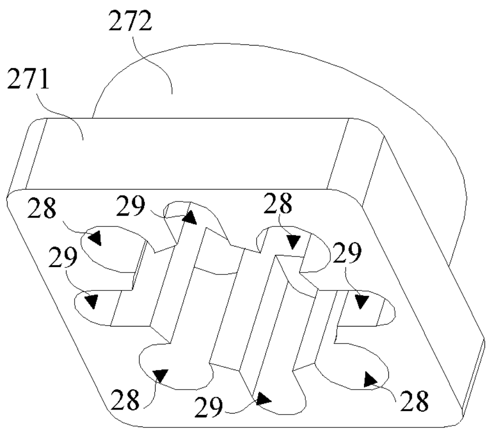
FIG. 15 is the second perspective view of the mounting portion of the heating components in the embodiment of the present invention.

Referring to FIG. 14 and FIG. 15, the mounting portion 27 is provided with the through-hole 28 for the first anode wire 231, the first cathode wire 233, the second anode wire 232 and the second cathode wire 234 to pass through. The mounting portion 27 is provided with the through-hole 273 that is provided around the heating body 23. Specifically, the through-hole 273 goes through the first part 271 and the second part 272 of the mounting portion 27 along the axial direction. The inner circumferential surfaces of the first part 271 and the second part 272 are fit with the outer surface of the heating body 23 respectively, wherein the inner circumferential surface of the first part 271 is spaced apart from the heating body 23 in the radial direction. Provided with the radial interval 29, the contact area of the heating body 23 and the mounting portion 27 decreases, resulting in good thermal insulation.

In the present embodiment, the fixed seat 25 is detachably mounted on the circuit control board 24. For example, the fixed seat 25 can be screwed with the circuit control board 24, which is easy for disassembly.

Figure 11:
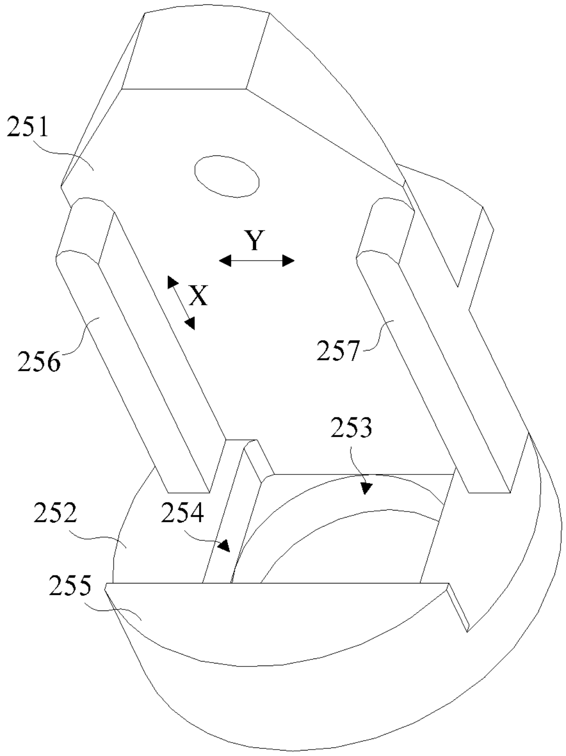
FIG. 11 is the first perspective view of the fixed seat of the heating components in the embodiment of the present invention.
Figure 12:
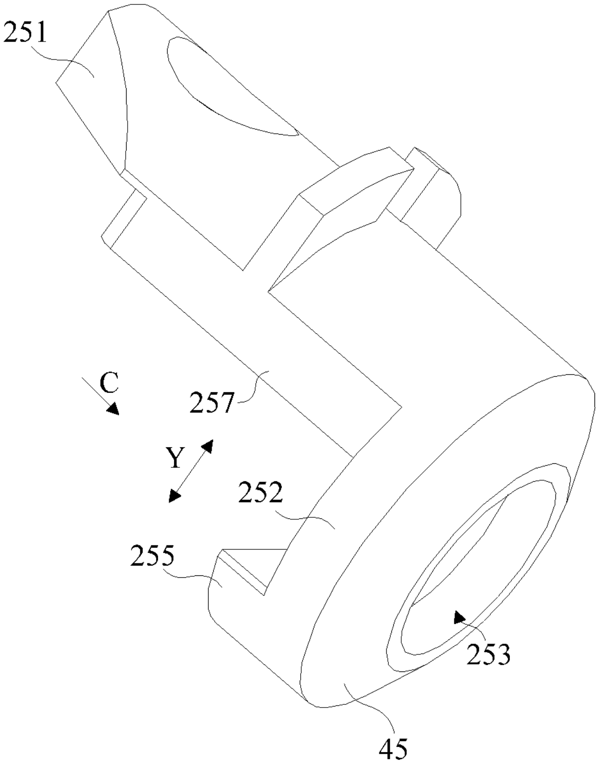
FIG. 12 is the second perspective view of the fixed seat of the heating components in the embodiment of the present invention.
Figure 16:
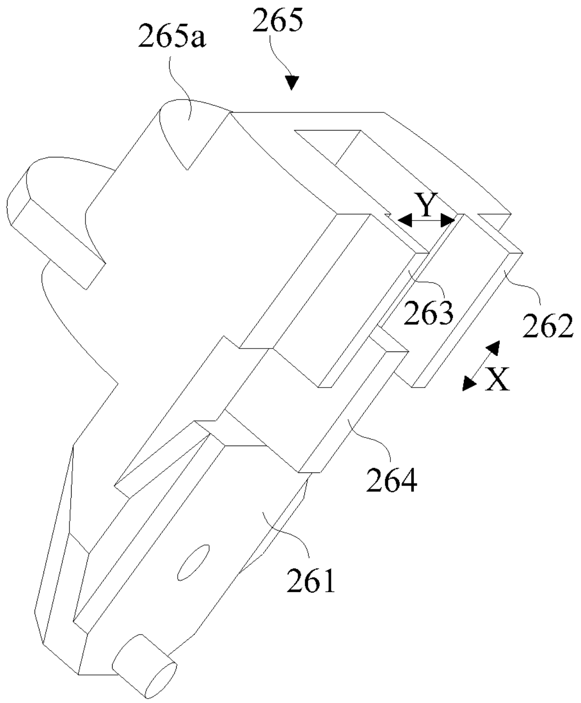
FIG. 16 is the first perspective view of the limiting portion of the heating components in the embodiment of the present invention.
Figure 17:
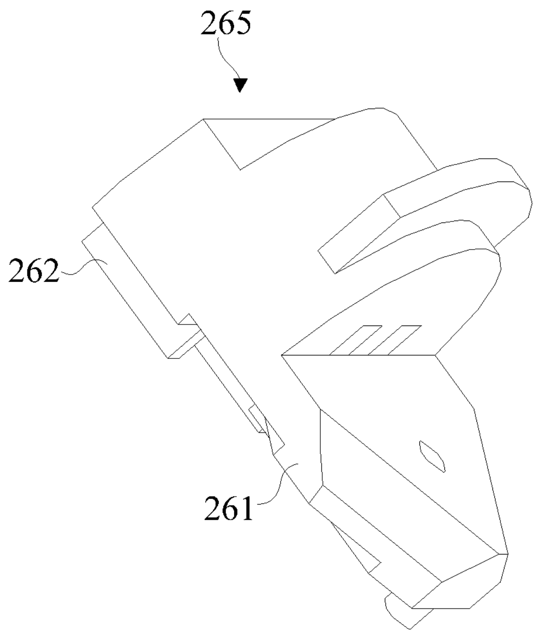
FIG. 17 is the second perspective view of the limiting portion of the heating components in the embodiment of the present invention.

Referring to FIG. 11 and FIG. 12, the fixed seat 25 further comprises the first extension portion 251. In the embodiment, the first extension portion 251 is provided on the portion of the accommodating portion 252 facing away from the fourth through-hole 253, extending along the axial direction (shown as the X direction in FIG. 11). Referring to FIG. 16 and FIG. 17, the limiting portion 26 comprises the second extension portion 261 that extends along the axial direction. Referring to FIG. 9 and FIG. 10, in the embodiment, the circuit control board 24 is provided between the first extension portion 251 and the second extension portion 261 along the radial direction (shown as the Y direction in FIG. 9 and FIG. 10), connected to the first extension portion 251 and the second extension portion 261 respectively, which is equivalent to that the circuit control board 24 is clamped by the first extension portion 251 and the second extension portion 261, so the connection is more stable.

Figure 18:
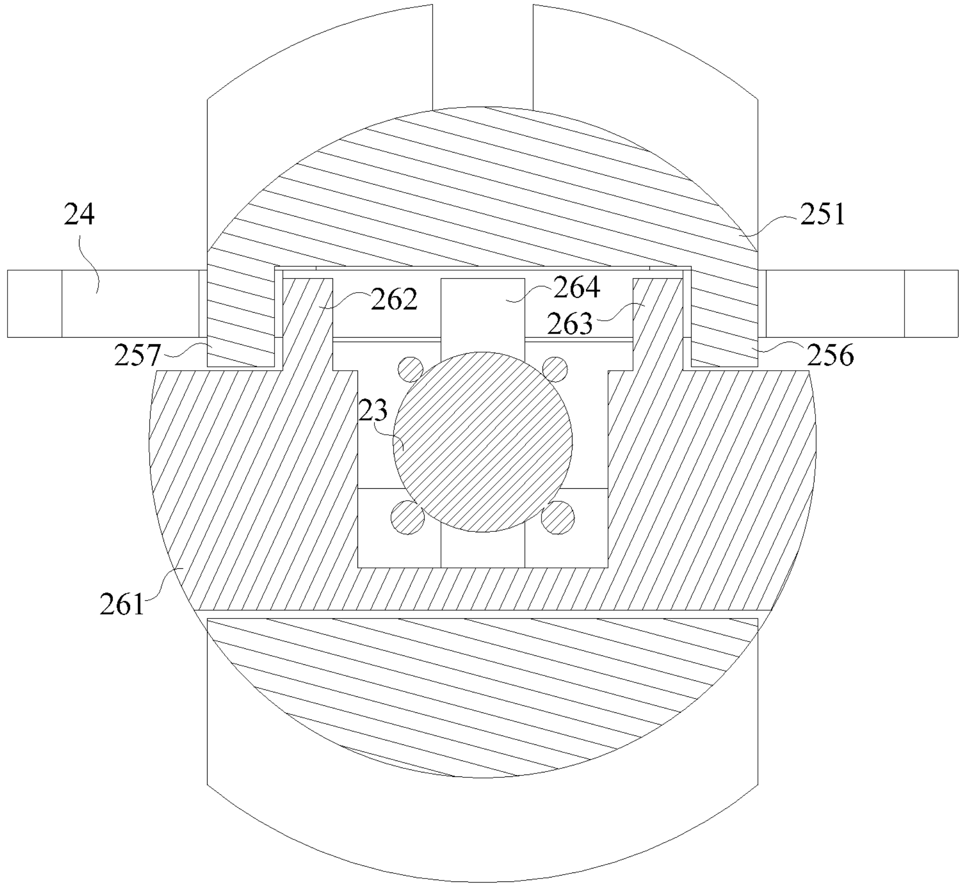
FIG. 18 is a section view of the heating components of the aerosol generating device in the embodiment of the present invention.

In the present embodiment, the first extension portion 251 and the second extension portion 261 are detachably connected to the circuit control board 24 respectively. For example, the detachable connection can be achieved by using a bolted connection, which is easy for disassembly:

Referring to FIG. 11 and FIG. 12, the portion of the first extension portion 251 facing the circuit control board 24 is provided with the first clamping portion 257 and the second clamping portion 256 that extend respectively along the axial direction. The first clamping portion 257 and the second clamping portion 256 are arranged oppositely and parallel to each other along the radial direction (shown as the Y direction in FIG. 11). Referring to FIG. 16 and FIG. 17, the portion of the second extension portion 261 facing the circuit control board 24 is provided with the third clamping portion 262 and the fourth clamping portion 263 that extend respectively along the axial direction. The third clamping portion 262 and clamping portion 263 are arranged oppositely and parallel to each other along the radial direction (shown as the Y direction in FIG. 16). Referring to FIG. 18, the third clamping portion 262 and the fourth clamping portion 263 are placed between the first clamping portion 257 and the second clamping portion 256. In other embodiments, the first clamping portion and the second clamping portion are placed between the third clamping portion and the fourth clamping portion.

Referring to FIG. 18, in the embodiment, the first clamping portion 257 fits with the third clamping portion 262, and the second clamping portion 256 fits with the fourth clamping portion 263, so the connection between the fixed seat 25 and the limiting portion 26 is stable. In the embodiment, the clamping space defined by the first clamping portion 257, the second clamping portion 256, the third clamping portion 262 and the fourth clamping portion 263 can accommodate the mounting portion 27. At the meantime, referring to FIG. 16, the portion of the second extension portion 261 facing the circuit control board 24 is provided with the limiting component 264 that extends along the axial direction and is abutted against the mounting portion 27. In the present embodiment, the limiting component 264 is abutted against the heating body 23 along the axial direction to limit the axial movement of the heating body 23. Additionally, the limiting component 264 is parallel to the third clamping portion 262 and the fourth clamping portion 263 respectively, and is placed between the third clamping portion 262 and the fourth clamping portion 263. As a result, provided with the clamping space and the limiting component 264, the axial movement of the mounting portion 27 is limited, so that the axial movement of the heating body 23 is also limited, which is easy for mounting.

It should be noted that, the relative position relationship of the limiting component, the first clamping portion, the second clamping portion, the third clamping portion and the fourth clamping portion is not limited. Other relative position relationships may be present as long as the following requirements are satisfied: the clamping space defined by the first clamping portion, the second clamping portion, the third clamping portion and the fourth clamping portion can accommodate the mounting portion: the limiting component can limit the axial movement of the mounting portion so as to limit the axial movement of the heating body.

Referring to FIG. 11 and FIG. 12, the fixed seat 25 further comprises the third extension portion 255. In the embodiment, the third extension portion 255 is provided on the portion of the accommodating portion 252 facing away from the fourth through-hole 253, extending along the axial direction, and is arranged opposite to the first extension portion 251 along the radial direction (shown as the y direction in FIG. 12). Referring to FIG. 16 and FIG. 17, the second extension portion 261 is provided with the insertion end 265. As shown by combining with FIG. 10, the insertion end 265 is inserted axially between the first extension portion 251 and the third extension portion 255 and is fit with the third extension portion 255 in the axial direction. With such configuration, the stable connection between the fixed seat 25 and the limiting portion 26 can be ensured.

In the embodiment, the insertion end 265 is provided with the resisting portion **265*a* and is inserted between the first extension portion 251 and the third extension portion 255 along the axial direction, wherein the resisting portion 265*a* of the insertion end 265 is fit with the third extension portion 255 in the axial direction. With such configuration, the stable connection between the fixed seat 25 and the limiting portion 26** can be ensured.

In the present invention, the aerosol generating device 1 further comprises the passage for debris discharge which allows the debris in the inner case 11 of the releasing mechanism 10 to flow out. In the present invention, the body portion of the device 20 is spaced apart from the base 40 of the releasing mechanism 10 in the axial direction. In the embodiment, the fixed seat 25 of the body of the device 20 is spaced apart from the base 40 of the releasing mechanism 10 in the axial direction (shown as the X direction in FIG. 8).

Specifically, referring to FIG. 8, in the embodiment, the passage for debris discharge comprises the structure for debris discharge of the releasing mechanism 10 mentioned above and an axial interval between the fixed seat 25 of the body of the device 20 and the base 40 of the releasing mechanism 10 in the axial direction. In addition, the base 40 is provided around the fixed seat 25 and is moveable around the fixed seat 25 in the circumferential direction.

The structure for debris discharge comprises the inclined hole 42, and the inclined hole 42 can guide the debris in the inner case 11 to flow out through the inclined hole 42. The outer circumferential surface of the base 40 is provided with at least one inclined hole 42 connecting to the third through-hole 41 which is provided around the heating body 23. In other embodiments, the third through-hole 41 is provided on the other portion of the base 40 rather than around the heating body, and is connected to the inclined hole.

Provided with the inclined hole 42, as shown by the track of the dashed arrow in FIG. 8, the debris in the third through-hole 41 will flow into the axial interval between the fixed seat 25 and the base 40 and then flow out by following the inclined hole 42, which is convenient for cleaning.

Referring to FIG. 8 to FIG. 10 and FIG. 12, the body portion of the device 20 comprises the fixed seat 25 with the accommodating portion 252 on which the mounting portion 27 of the heating body 23 is mounted, wherein the accommodating portion 252 is used for limiting the circumferential movement of the mounting portion 27, and the fixed seat 25 is spaced apart from the base 40 of the releasing mechanism 10 in the axial direction. The portion of the fixed seat 25 facing the base 40 comprises a surface (shown as the second surface 45) arranged aslant with respect to the portion of the releasing mechanism 10 facing the fixed seat 25 (shown as the first surface 44) along the axial direction. So the passage for debris discharge is formed by the upper surface of the fixed seat 25, the lower surface 44 of the base 40, the third through-hole 41 and the inclined hole 42. That is, the passage for debris discharge is formed by the fixed seat 25 and the base 40 together.

The plane of the second surface 45 is set at an acute angle with the plane of the first surface 44. In the embodiment, the acute angle ranges from 30 degrees to 60 degrees, including 30 degrees and 60 degrees, and it may also be 43.5 degrees. Within this range of the angle, it is advantageous for the debris in the third through-hole 41 to flow out from the inclined hole 42. It should be noted that after the base 40 of the releasing mechanism 10 is rotatably connected to the body portion of the device 20, there will be a radial interval between the base 40 and the fixed seat 25, so that the outer case 14 drives the circumferential movement of the inner case 11. The base 40 can move frictionlessly around the fixed seat 25 in the circumferential direction, which extends the service life of the aerosol generating device. In addition, the radial interval between the base 40 and the fixed seat 25 should be as small as possible, ideally being fit without force exerted, in order to prevent debris from falling into the radial interval between the base 40 and the fixed seat 25.

In conclusion, the above-described embodiments of the present invention are merely illustrative of the principles and effects of the present invention, and are not intended to limit the present invention. Modifications or variations of the above-described embodiments may be made by those skilled in the art without departing from the spirit and scope of the invention. Therefore, all equivalent modifications or changes made by those skilled in the art without departing from the spirit and scope of the invention will be covered by the appended claims.

The invention claimed is:

1. An aerosol generating device, comprising:

a heating body; and a releasing mechanism, wherein the heating body is used to be inserted into an aerosol-forming substrate placed on the releasing mechanism, the releasing mechanism comprising:

a rotary portion comprising an outer case and an inner case, wherein the outer case is sleeved on the inner case and the aerosol-forming substrate is placed on the inner case; and a pressing mechanism provided on the inner case, wherein the outer case is movable along a circumferential direction, and a circumferential movement is transferred to movement along an axial direction which coincides with an inserting direction of the heating body, to drive the pressing mechanism to apply a radial pressing force to the aerosol-forming substrate, wherein the inner case is rotatably connected to the aerosol generating device between a first position and a second position, and the aerosol-forming substrate and the heating body are relatively movable in the circumferential direction when switching from the first position to the second position, and wherein both in the first position and in the second position, the aerosol-forming substrate is in contact with the heating body.

2. The aerosol generating device according to claim 1, characterized in that the aerosol-forming substrate has a first axial position with respect to the heating body in the first position; the aerosol-forming substrate has a second axial position with respect to the heating body in the second position, and the first axial position is the same as the second axial position.

3. The aerosol generating device according to claim 1, characterized in that the inner case is rotatable along the circumferential direction in synchronization with the outer case when switching from the first position to the second position.

4. The aerosol generating device according to claim 3, characterized in that one of an inner circumferential surface of the outer case and the outer circumferential surface of the inner case is provided with a first groove extending along the axial direction and an other is a convex component, wherein the convex component is disposed in the first groove.

5. The aerosol generating device according to claim 1, characterized in that along the axial direction, the outer case has a first end facing the aerosol generating device and the aerosol generating device has a second end facing the outer case, wherein one of the first end and the second end comprises a first convex portion and an other comprises a second concave portion, the first convex portion and the second concave portion are matched with each other.

6. The aerosol generating device according to claim 5, characterized in that the first end comprises a first convex portion and a first concave portion which are provided alternately, and the second end comprises a second convex portion and a second concave portion which are provided alternately, wherein a shape of the first convex portion matches the shape of the second concave portion and the shape of the second convex portion matches the shape of the first concave portion.

7. The aerosol generating device according to claim 1, characterized in that the outer case is screwed with the aerosol generating device.

8. The aerosol generating device according to claim 1, characterized in that an inner case is provided with at least one first through-hole connecting with an inner chamber of the inner case and extending along the axial direction, the pressing mechanism is provided with a first end and a second end along the axial direction, wherein the first end is closer to an opening of the axial end of the inner case than the second end, and at least one of the first end and the second end is connected fixedly with the inner case; the portion between the first end and the second end is used for applying a radial pressing force to the aerosol-forming substrate.

9. The aerosol generating device according to claim 8, characterized in that a convex part is provided between the first end and the second end, which protrudes from the first through-hole toward an inner wall of the outer case.

10. The aerosol generating device according to claim 9, characterized in that the portion between the convex part and one of the first end and the second end is provided with a curved portion.

11. The aerosol generating device according to claim 9, characterized in that the portion between a convex portion and one of the first end and the second end is provided with a curved part.

12. The aerosol generating device according to claim 9, characterized in that the convex part is abutted against the inner wall of the outer case.

13. The aerosol generating device according to claim 12, characterized in that there is an elastic force between a convex portion and the inner wall of the outer case along the radial direction.

14. The aerosol generating device according to claim 9, characterized in that the inner wall of the outer case is provided with a second groove, wherein the convex part is disposed in the second groove.

15. The aerosol generating device according to claim 8, characterized in that the inner case comprises a base provided with a concave part, wherein the second end is inserted into a concave portion.

16. The aerosol generating device according to claim 15, characterized in that the concave part goes through the base along the axial direction.

17. The aerosol generating device according to claim 9, characterized in that a rear surface of a convex portion is a concave surface.

18. The aerosol generating device according to claim 8, characterized in that the portion between the first end and the second end facing the aerosol-forming substrate is a flat surface.

19. The aerosol generating device according to claim 8, characterized in that the portion between the first end and the second end facing the aerosol-forming substrate is provided with a protrusion.

20. The aerosol generating device according to claim 19, characterized in that the first end is connected fixedly with the inner case, and the second end is connected flexibly with the inner case.

21. The aerosol generating device according to claim 1, characterized in that the inner case is provided with at least one second through-hole connecting with an inner chamber of the inner case and extending along the axial direction, the heating body is exposed by the second through-hole.

22. The aerosol generating device according to claim 21, characterized in that at least two second through-holes are provided and spaced apart along the circumferential direction.

23. The aerosol generating device according to claim 1, characterized in further comprising a structure for debris discharge which allows the debris in the inner case to flow out.

24. The aerosol generating device according to claim 23, characterized in that the structure for debris discharge comprises an inclined hole, and the inclined hole can guide the debris in the inner case to flow out through the inclined hole.

25. The aerosol generating device according to claim 24, characterized in further comprising a base, wherein the structure for debris discharge comprises a third through-hole provided on the base, the third through-hole is connected to the inclined hole, and the inclined hole can guide the debris in the third through-hole to flow out through the inclined hole.

26. The aerosol generating device according to claim 25, characterized in that the third through-hole is provided around the heating body.

27. The aerosol generating device according to claim 25, characterized in that the inclined hole is provided with a first surface and a second surface which are arranged oppositely, wherein the third through-hole is provided on a plane of the first surface, and the plane of the second surface is set at an acute angle with the plane of the first surface.

28. The aerosol generating device according to claim 27, characterized in that the acute angle ranges from 30 degrees to 60 degrees.

29. The aerosol generating device according to claim 19, characterized in that the outer case comprises:
- a body portion of the outer case,
- an inner lining arranged around an inner circumferential surface of the body portion of the outer case along the circumferential direction.

30. The aerosol generating device according to claim 29, characterized in that along the axial direction, the body portion of the outer case comprises a first annular component and a second annular component that are connected with each other, wherein the second annular component is closer to the aerosol generating device compared to the first annular component.

31. The aerosol generating device according to claim 30, characterized in that the second annular component has a bumpy surface.

32. The aerosol generating device according to claim 19, characterized in that the outer case is detachably connected with the inner case.

33. The aerosol generating device according to claim 32, characterized in further comprising a body portion, wherein the heating body is provided on the body portion, and the inner case is rotatably connected to the body portion of the device in the circumferential direction.

34. The aerosol generating device according to claim 32, characterized in further comprising the body portion, wherein the heating body is provided on the body portion, and the inner case is rotatably connected to the heating body in the circumferential direction.

35. The aerosol generating device according to claim 34, characterized in that the body portion of the device is provided with a fixed seat with an accommodating portion on which a mounting portion of the heating body is mounted, wherein the accommodating portion is used for limiting a circumferential movement of the mounting portion.

36. The aerosol generating device according to claim 34, characterized in that the fixed seat comprises the accommodating portion and a fourth through-hole along an axial direction;
- the heating body goes through the fourth through-hole along a direction from the accommodating portion to the fourth through-hole;
- the fixed seat is mounted on a circuit control board which is electrically connected to the heating body.

37. The aerosol generating device according to claim 35, characterized in further comprising a limiting portion mounted on the fixed seat along an axial direction, and the mounting portion is provided between the limiting portion and the accommodating portion, wherein the limiting portion is used for limiting an axial movement of the mounting portion.

38. The aerosol generating device according to claim 35, characterized in that cross sections of the mounting portion and the accommodating portion are not in a shape of a circle.

39. The aerosol generating device according to claim 37, characterized in that in the direction from the accommodating portion to the fourth through-hole, the mounting portion comprises a first part and a second part, and the accommodating portion comprises a third part and a fourth part, wherein the first part is mounted on the third part and the second part is mounted on the fourth part, cross sections of the first part and the third part are not in a shape of a circle, or the cross sections of the second part and the fourth part are not in a shape of a circle.

40. The aerosol generating device according to claim 36, characterized in that in the direction from the accommodating portion to the fourth through-hole, the mounting portion comprises a first part and a second part, wherein the first part is mounted on the accommodating portion and the second part is mounted on the fourth through-hole, cross sections of the first part and the accommodating portion are not in a shape of a circle, or the cross sections of the second part and the fourth through-hole are not in a shape of a circle.

41. The aerosol generating device according to claim 32, characterized in further comprising wires, and a mounting portion of the heating body is provided with a through-hole for the wires to pass through.

42. The aerosol generating device according to claim 32, characterized in that an inner circumferential surface of a mounting portion of the heating body fits with an outer circumferential surface of the heating body, and the inner circumferential surface of the mounting portion is spaced apart from the heating body in a radial direction.

43. The aerosol generating device according to claim 36, characterized in that the fixed seat is detachably mounted on the circuit control board.

44. The aerosol generating device according to claim 37, characterized in that the fixed seat further comprises a first extension portion that extends along the axial direction, the limiting portion comprises a second extension portion that extends along the axial direction, wherein a circuit control board is provided between the first extension portion and the second extension portion, connected to the first extension portion and the second extension portion respectively.

45. The aerosol generating device according to claim 44, characterized in that the first extension portion and the second extension portion are detachably connected to the circuit control board respectively.

46. The aerosol generating device according to claim 44, characterized in that the portion of the first extension portion facing the circuit control board is provided with a first clamping portion and a second clamping portion that extend along the axial direction respectively;

the portion of the second extension portion facing the circuit control board is provided with a third clamping portion and a fourth clamping portion that extend along the axial direction respectively, wherein the third clamping portion and the fourth clamping portion are placed between the first clamping portion and the second clamping portion, or alternatively the first clamping portion and the second clamping portion are placed between the third clamping portion and the fourth clamping portion;

the first clamping portion is fit with the third clamping portion, and the second clamping portion is fit with the fourth clamping portion.

47. The aerosol generating device according to claim 46, characterized in that a clamping space defined by the first clamping portion, the second clamping portion, the third clamping portion and the fourth clamping portion can accommodate the mounting portion.

48. The aerosol generating device according to claim 47, characterized in that the portion of the second extension portion facing the circuit control board is provided with a limiting component that extends along the axial direction and is abutted against the mounting portion.

49. The aerosol generating device according to claim 44, characterized in that the fixed seat further comprises a third extension portion that extends along the axial direction and is arranged opposite to the first extension portion along a radial direction, the second extension portion is provided with an insertion end that is inserted between the first extension portion and the third extension portion along the axial direction and is fit with the third extension portion in the axial direction.

50. The aerosol generating device according to claim 34, characterized in further comprising a passage for debris discharge which allows the debris in the inner case to flow out.

51. The aerosol generating device according to claim 50, characterized in that the body portion of the device is spaced apart from a base of the releasing mechanism along an axial direction.

52. The aerosol generating device according to claim 50, characterized in that the passage for debris discharge comprises a structure for debris discharge of the releasing mechanism and an axial interval between a fixed seat of the body portion of the device and a base of the releasing mechanism, wherein the structure for debris discharge comprises a inclined hole, and the inclined hole can guide the debris in the inner to flow out through the inclined hole.

53. The aerosol generating device according to claim 52, characterized in that the structure for debris discharge comprises a base and a third through-hole provided on the base, wherein the third through-hole is connected to the inclined hole, and the inclined hole can guide the debris in the third through-hole to flow out through the inclined hole.

54. The aerosol generating device according to claim 53, characterized in that the third through-hole is provided around the heating body.

55. The aerosol generating device according to claim 51, characterized in that the body portion of the device is provided with a fixed seat with an accommodating portion on which a mounting portion of the heating body is mounted, wherein the accommodating portion is used for limiting a circumferential movement of the mounting portion, and the fixed seat is spaced apart from the base of the releasing mechanism along the axial direction.

56. The aerosol generating device according to claim 55, characterized in that the portion of the fixed seat facing the base is provided with a surface arranged aslant with respect to the portion of the releasing mechanism facing the fixed seat along the axial direction.

57. The aerosol generating device according to claim 42, characterized in that the mounting portion comprises a first part and a second part, and the inner circumferential surfaces of the first part and the second part are fit with the outer surface of the heating body respectively, wherein the inner circumferential surface of the first part is spaced apart from the heating body in the radial direction.

* * * * *